United States Patent
Hossain

(10) Patent No.: US 11,466,203 B1
(45) Date of Patent: Oct. 11, 2022

(54) METHOD OF INCREASING A FLUORESCENCE SIGNAL OF A FLUOROPHORE

(71) Applicant: KING FAHD UNIVERSITY OF PETROLEUM AND MINERALS, Dhahran (SA)

(72) Inventor: Mohammed Kamal Hossain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/748,610

(22) Filed: May 19, 2022

Related U.S. Application Data

(60) Provisional application No. 63/324,343, filed on Mar. 28, 2022.

(51) Int. Cl.
| | |
|---|---|
| *C09K 11/06* | (2006.01) |
| *G02B 5/00* | (2006.01) |
| *G02B 6/122* | (2006.01) |
| *B82Y 40/00* | (2011.01) |
| *B82Y 20/00* | (2011.01) |

(52) U.S. Cl.
CPC .............. *C09K 11/06* (2013.01); *B82Y 20/00* (2013.01); *B82Y 40/00* (2013.01)

(58) Field of Classification Search
CPC ....... G02B 6/1226; G02B 5/008; C09K 11/06
See application file for complete search history.

(56) References Cited

U.S. PATENT DOCUMENTS

2009/0004670 A1   1/2009   Zhang et al.

FOREIGN PATENT DOCUMENTS

| CN | 109696428 B | 8/2021 |
| IN | 201811044934 | 8/2020 |
| KR | 10-1068972 | 9/2011 |

OTHER PUBLICATIONS

Dong. The decoration of silver fractal-like nanostructure with Ag nanoparticles on the plastic slide for surface enhanced fluorescence. Electrochimica Acta 60 (2012) 264-268 (Year: 2012).*

(Continued)

*Primary Examiner* — Matthew E. Hoban
(74) *Attorney, Agent, or Firm* — Oblon, McClelland, Maier & Neustadt, L.L.P.

(57) ABSTRACT

A method of increasing a fluorescence signal of a fluorophore is provided. The method includes dissolving the fluorophore in a solvent to form a solution and adding silver nanoparticles to the solution to form a mixture. The silver nanoparticles have a size of 3-10 nm, and the silver nanoparticles have an irregular shape and at least one fractal structure. The method further includes at least partially coating a substrate with the mixture to form a fluorescence sample and recording a fluorescence image of the fluorescence sample. The fluorophore is adsorbed to at least one silver nanoparticle and the fluorescence signal of the fluorescence image is higher than a fluorescence signal of a fluorescence image of the fluorophore without the silver nanoparticles.

20 Claims, 16 Drawing Sheets

(56) References Cited

OTHER PUBLICATIONS

Nickolaev, et al.; Effect of Silver Nanoparticles on the Fluorescence Intensity of Rhodamine 6G and Sulforhodamine 101; Telecommunications and Radio Engineering vol. 75, Issue 11; 2016; Abstract Only; 3 Pages.
Yang, et al.; Silver Nanoparticles with Enhanced Fluorescence Effectson Fluorescein Derivative; Advanced Materials Research vols. 602-604; pp. 187-191; Dec. 2012; Abstract Only; 2 Pages.
Sabatini, et al.; Fluorescence Modulation of Acridine and Coumarin Dyes by Silver Nanoparticles; J. Fluoresc 17; pp. 377-382; Jun. 5, 2007; 6 Pages.

* cited by examiner

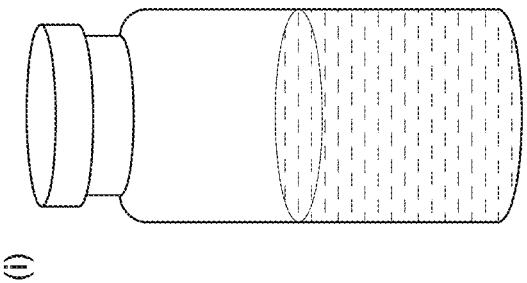
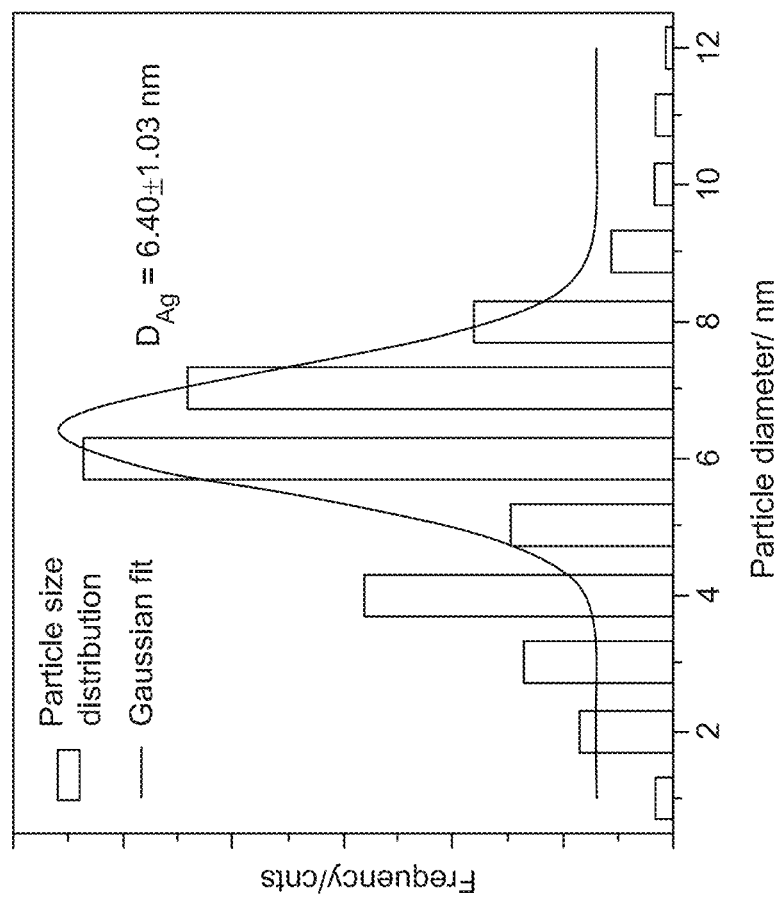
FIG. 2C

| Spot # | d-spacing (nm) | Amplitude (cnts) | [hkl] | ref. d-spacing (JCPDS 4-0783) |
|---|---|---|---|---|
| 1 | 0.2233 | 7561.40 | [111] | 0.236 |
| 2 | 0.2314 | 10811.51 | [111] | 0.236 |
| 3 | 0.2233 | 13316.16 | [111] | 0.236 |
| 4 | 0.2347 | 3651.89 | [111] | 0.236 |
| 5 | 0.2362 | 1792.09 | [111] | 0.236 |
| 6 | 0.1164 | 1507.64 | [222] | 0.118 |
| 7 | 0.1246 | 1424.87 | [311] | 0.123 |
| 8 | 0.1488 | 948.46 | [220] | 0.144 |
| 9 | 0.1239 | 1102.75 | [311] | 0.123 |

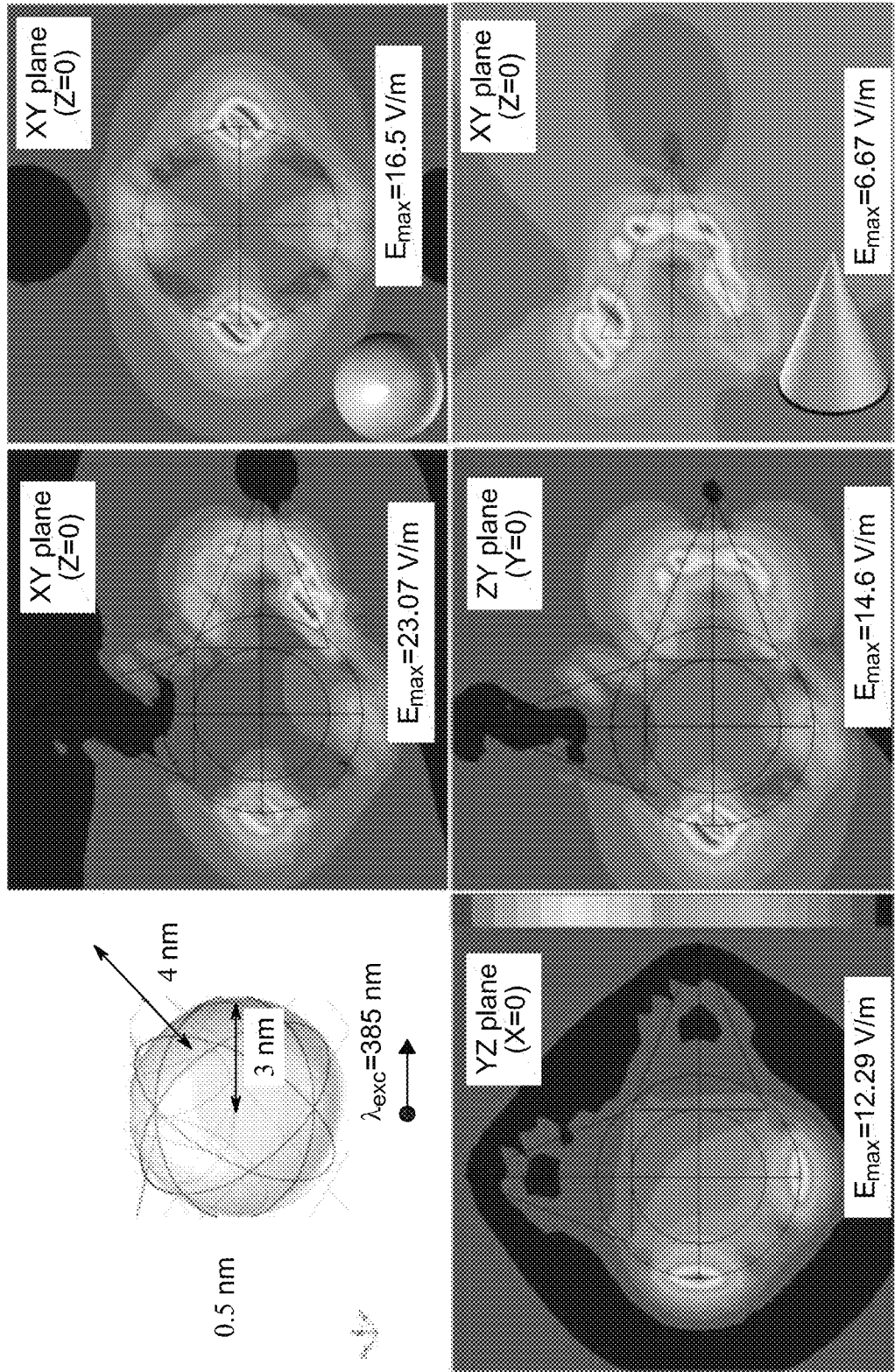

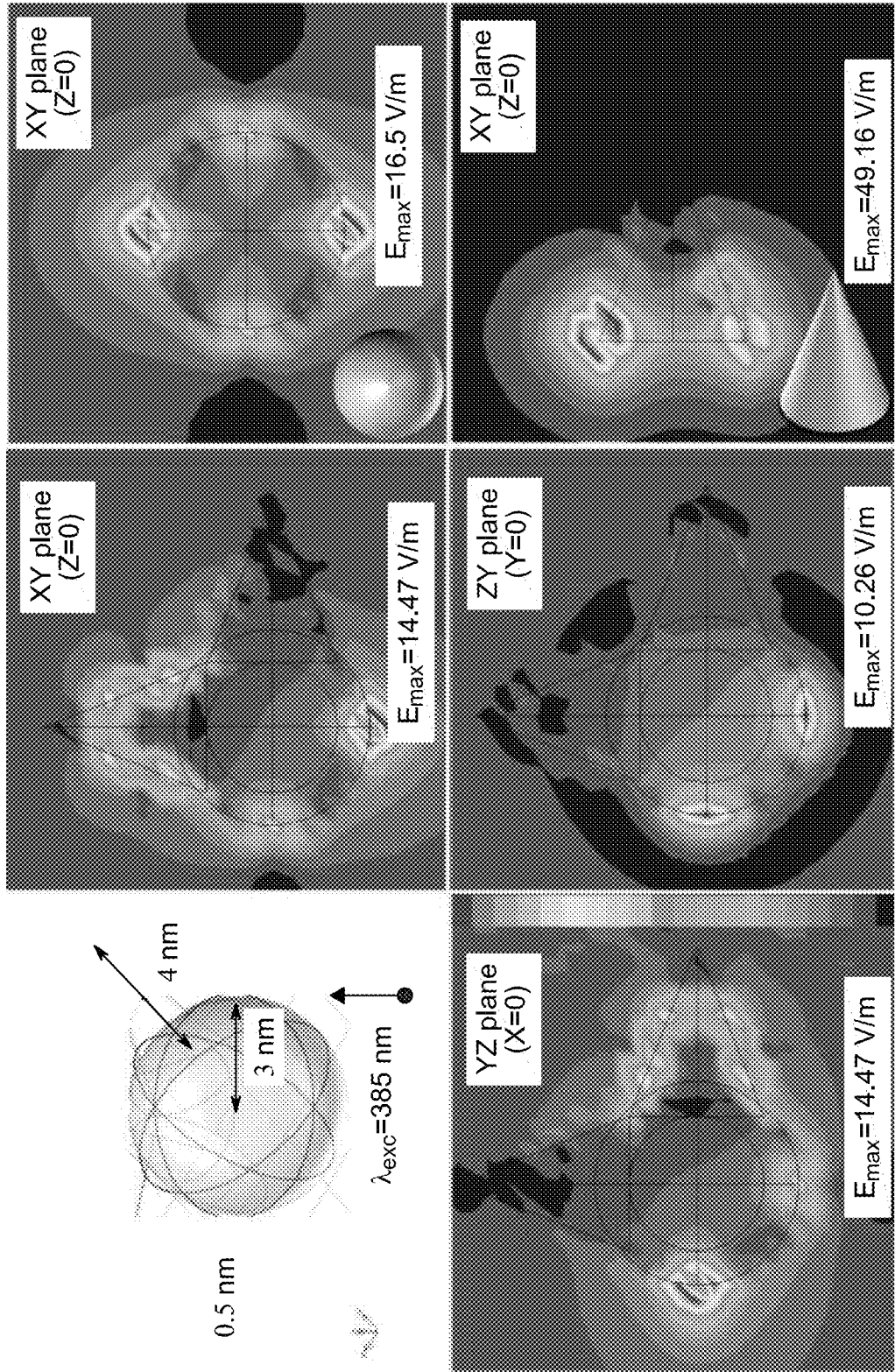

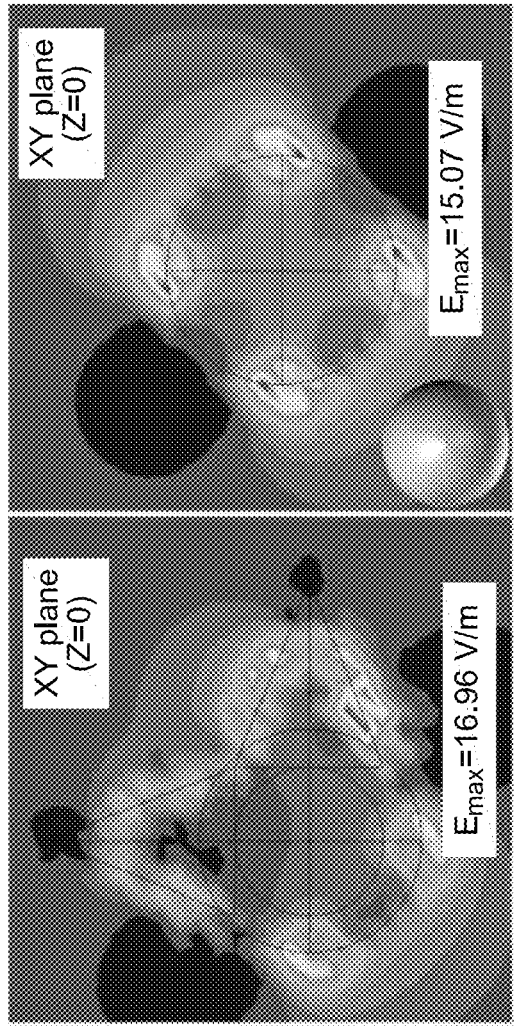
FIG. 8C
FIG. 8E
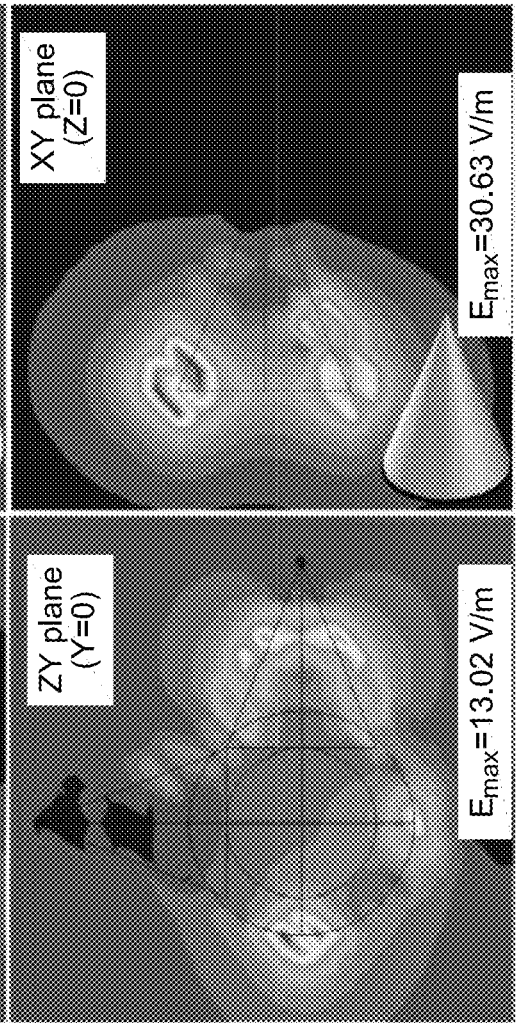
FIG. 8F
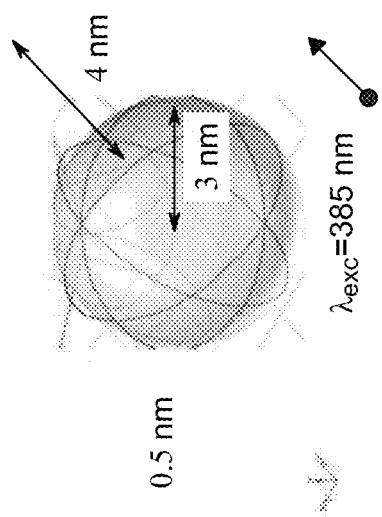
FIG. 8A
FIG. 8B
FIG. 8D

METHOD OF INCREASING A FLUORESCENCE SIGNAL OF A FLUOROPHORE

CROSS REFERENCE TO RELATED APPLICATION

This application claims the benefit of the filing date of U.S. Provisional Application No. 63/324,343, filed Mar. 28, 2022, which is incorporated herein by reference in its entirety.

BACKGROUND

Technical Field

The present disclosure is directed to fluorescence microscopy, and particularly, to a method of increasing a fluorescence microscopy signal of a fluorophore.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Fluorescence-based microscopy is a technique used in a diverse range of fields of research from single-molecule detection to early cancer diagnosis, super-resolution display, and quantum photonics. The technique is well-known because of its excellent sensitivity and selectivity, in addition to low invasiveness. However, due to very weak emission, the use of fluorescence microscopy faces challenges, and methods are needed to enhance intrinsic emission of analytes.

To address such challenges, a strategy, known as a surface-enhanced fluorescence (SEF), had been introduced. SEF enhancement is attributed to mainly two factors; one, designing a plasmon-active tag as a driving part, and two, positioning a fluorophore in the right place to provide the enhanced fluorescence. Noble metal nanoparticles, particularly, silver nanoparticles or nanostructures, are well-known fluorescent tags, and their plasmonic properties have been found very promising in fluorescence spectroscopy. By tuning the optical properties and nanomorphology of the silver nanoparticles, the detection efficiency can be enhanced several orders of magnitude through SEF. When the fluorophore is placed in a suitable position near the plasmon-active fluorescent tag, local electromagnetic (EM) near-field distributions enhance the excitation rate as well as a radiative decay rate and thus enhance fluorescence quantum yield. Many previous studies, adjust the positioning of the fluorophores by introducing a spacer or by shaping the plasmon active tag, which leads to a complicated design and inconsistent results.

As such, there exists a need to design a facile method that will provide strong electromagnetic (EM) near-field distributions and enhanced fluorescence emission without any additional spacer.

SUMMARY

In an exemplary embodiment, a method of increasing a fluorescence signal of a fluorophore is described. The method includes dissolving the fluorophore in a solvent to form a solution and adding silver nanoparticles to the solution to form a mixture. The silver nanoparticles have a size of 3-10 nanometers (nm) and the silver nanoparticles have an irregular shape and at least one fractal structure. The method further includes at least partially coating a substrate with the mixture to form a fluorescence sample and recording a fluorescence image of the fluorescence sample. The fluorophore is adsorbed to at least one silver nanoparticle and the fluorescence signal of the fluorescence image is higher than a fluorescence signal of a fluorescence image of the fluorophore without the silver nanoparticles.

In some embodiments, the silver nanoparticles have a substantially crystalline structure.

In some embodiments, the silver nanoparticles have hydroxide (—OH) and nitrogen oxide (—$NO_2$) functional groups on a surface.

In some embodiments, at least a portion of the silver nanoparticles have at least two fractal structures in an individual nanoparticle.

In some embodiments, at least a portion of the silver nanoparticles have at least two different lattice fringes in an individual nanoparticle.

In some embodiments, the lattice fringes are in different directions.

In some embodiments, the lattice fringes are in the same direction.

In some embodiments, a lattice fringe has a d-spacing of 0.20-0.24 nm and corresponds to the [200] crystal structure of silver.

In some embodiments, a lattice fringe has a d-spacing of 0.22-0.26 nm and corresponds to the [111] crystal structure of silver.

In some embodiments, at least a portion of the silver nanoparticles are twinned.

In some embodiments, the silver nanoparticles have an optical bandgap of 2.8-2.9 electron volts (eV).

In some embodiments, the silver nanoparticles have a maximum absorption signal at 350-400 nm.

In some embodiments, the silver nanoparticles have a maximum fluorescence signal at 420-440 nm.

In some embodiments, the silver nanoparticles have an electromagnetic field intensity of 6-60 volts per meter (V/m).

In some embodiments, the fluorophore is selected from a group consisting of a rhodamine derivative, a fluorescein derivative, a cyanine derivative, and a coumarin derivative.

In some embodiments, the fluorescence sample is irradiated with 300-330 nm light to record the fluorescence image.

In some embodiments, the fluorescence signal of the fluorescence image is 10 to 10,000 times higher than a fluorescence signal of a fluorescence image of the fluorophore without the silver nanoparticles.

In some embodiments, the silver nanoparticles are made by a method comprising dissolving sodium borohydride in water at a temperature of 5 to 15 degrees centigrade (° C.) to form a 1-3 mM sodium borohydride stock solution, dissolving silver nitrate in water at a temperature of 20 to 25° C. to form a 0.5-2 milli Molar (mM) silver nitrate stock solution, and adding the silver nitrate stock solution dropwise to the sodium borohydride stock solution at a temperature of 5 to 15° C. to form a silver nanoparticle solution. The sodium borohydride stock solution and silver nitrate stock solution are added together within 30 minutes of dissolving the sodium borohydride and silver nitrate in water.

In some embodiments, the rate of dropwise addition is 1-10 drops per second.

In some embodiments, the method includes centrifuging the silver nanoparticle solution and filtering to leave a solid and washing the solid with water to form the silver nanoparticles.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2C illustrates a nanoparticles size distribution confirming an average diameter of 6.40±1.03 nanometer (nm) along with a Gaussian fit (in black line), further inset (i) represents a charge-coupled device (CCD) image of the nanoparticles size distribution confirming a highly monodisperse, according to certain embodiments;

FIG. 6A illustrates an SS3C model used in a Finite-Difference Time-Domain (FDTD) simulation, a spheroid at the center surrounded by three cones at x-, y-, and z-axes; a black arrow indicates the polarization direction, according to certain embodiments;

FIGS. 6B-6D illustrate an electromagnetic (EM) near-field distributions of the same model at YZ (X=0)-, XY (Z=0)-, and ZX (Y=0)-planes, respectively, according to certain embodiments;

FIG. 6E illustrates the EM near-field distribution of a spheroid (i.e., the core of the model SS3C) at XY (Z=0)-plane only; inset represents spheroid used in the simulation, according to certain embodiments;

FIG. 6F illustrates the EM near-field distribution of a cone (i.e., a segment of the model SS3C) at XY (Z=0)-plane only; inset represents cone used in the simulation. The bar represents the intensity of EM near-field distribution. Respective planes and maximum EM fields are mentioned therein in each figure, according to certain embodiments;

FIG. 7A illustrates an SS3C model used in FDTD simulation, a spheroid at the center surrounded by three cones at x-, y-, and z-axes; a black arrow indicates the polarization direction, according to certain embodiments;

FIGS. 7B-7D illustrate the EM near-field distributions of the same model at YZ (X=0)-, XY (Z=0)-, and ZX (Y=0)-planes, respectively, according to certain embodiments;

FIG. 7E illustrates the EM near-field distribution of a spheroid (i.e., the core of the model SS3C) at XY (Z=0)-plane only; inset represents spheroid used in the simulation, according to certain embodiments;

FIG. 7F illustrates the EM near-field distribution of a cone (i.e., a segment of the model SS3C) at XY (Z=0)-plane only; inset represents cone used in the simulation. The bar represents the intensity of EM near-field distribution. Respective planes and maximum EM fields are mentioned therein in each figure, according to certain embodiments;

FIG. 8A illustrates an SS3C model used in FDTD simulation, a spheroid at the center surrounded by three cones at x-, y-, and z-axes; a black arrow indicates the polarization direction, according to certain embodiments;

FIGS. 8B-8D illustrate the EM near-field distributions of the same model at YZ (X=0)-, XY (Z=0)-, and ZX (Y=0)-planes, respectively, according to certain embodiments;

FIG. 8E illustrates EM near-field distribution of a spheroid (i.e., the core of the model SS3C) at XY (Z=0)-plane only; inset represents spheroid used in the simulation, according to certain embodiments; and FIG. 8F illustrates the EM near-field distribution of a cone (i.e., a segment of the model SS3C) at XY (Z=0)-plane only; inset: cone used in the simulation. The bar represents the intensity of the EM near-field distribution. Respective planes and maximum EM fields are mentioned therein in each figure, according to certain embodiments.

DETAILED DESCRIPTION

Figure 1:
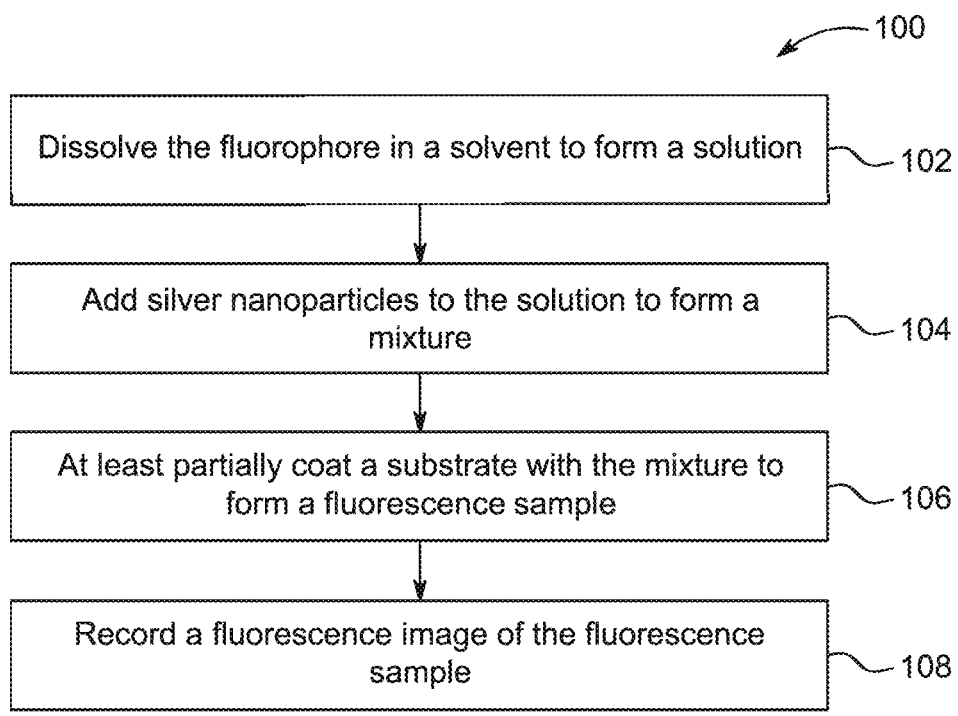
FIG. 1 is a schematic flow diagram of a method of increasing a fluorescence signal of a fluorophore, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "fluorescence" refers to a process where a material absorbs light at high energy and short wavelength and emits light at lower energy.

As used herein, the term "fluorophore" refers to a molecule, which may be proteins, small organic compounds, or synthetic polymers that absorb light of specific wavelengths and emit light of longer wavelengths.

As used herein, the term "emission" refers to a process of elements releasing different photons of color as their atoms return to their lower energy levels.

As used herein, the term "nanoparticle" refers to a small particle that ranges between 1 to 1,000 nanometers in size.

As used herein, the term "arbitrary-shaped" or "irregular shaped" refers to not a specified, or specific, kind of shape.

As used herein, the term "fractal structure" refers to a rough or fragmented geometric shape containing structure at arbitrarily small scales.

As used herein, the term "lattice fringe" refers to a structural feature of a particle.

Embodiments of the present disclosure are directed to a method of increasing a fluorescence signal of a fluorophore. As described herein in certain embodiments, the fluorophore in the presence of irregular shaped silver nanoparticles displays a higher fluorescence signal than that of the fluorophore without the silver nanoparticles, through surface-enhanced fluorescence (SEF). The silver nanoparticles were characterized with UV-vis, fluorescence, FT-IR, SAED, and TEM spectroscopy. Also, the method of SEF was simulated by finite difference time domain (FDTD) analysis to calculate electromagnetic (EM) near-field distributions.

Referring to FIG. 1, a schematic flow diagram of a method 100 of increasing the fluorescence signal of the fluorophore is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes dissolving the fluorophore in a solvent to form a solution. In some embodiments, the fluorophore is selected from a group consisting of a rhodamine derivative, a fluorescein derivative, a cyanine derivative, and a coumarin derivative. In some embodiments, the fluorophore is rhodamine 6G. In some embodiments, the solvent is any solvent that the fluorophore is soluble in. In some embodiments, the solvent is water. In some embodiments, the fluorophore has a concentration of 1 nanomolar (nM) to 1 millimolar (mM), preferably 100 nM to 100 μM, or approximately 1 μM, in the solution.

At step 104, the method 100 includes adding silver nanoparticles to the solution to form a mixture. In some embodiments, the silver nanoparticles have a size of 3-10 nm, preferably 4-9 nm, 5-8 nm, or 6-7 nm. In some embodiments, the silver nanoparticles are 10-100 nm, preferably 20-90 nm, 30-80 nm, 40-70 nm, or 50-60 nm. In some embodiments, the silver nanoparticles have a size distribution of less than 10 nm, preferably less than 5 nm, or less than 1 nm. In some embodiments, the silver nanoparticles have a substantially crystalline structure. In some embodiments, the at least 50% of the silver nanoparticles are crystalline, preferably 60%, 70%, 80%, 90%, or 100%. In some embodiments, the silver nanoparticles have hydroxide (—OH) and nitrogen dioxide (—$NO_2$) functional groups on a surface. In some embodiments, the silver nanoparticles have at least one of a hydroxide, a nitrogen dioxide, a thiol, a carboxyl, or an alkyl functional group on a surface.

In some embodiments, the silver nanoparticles have an irregular shape with at least one fractal structure. In some embodiments, less than 10% of the nanoparticles have a spherical shape, preferably 5%, or 1%. In some embodiments, none of the silver nanoparticles have a spherical shape. In some embodiments, at least a portion of the silver nanoparticles have at least two fractal structures in an individual nanoparticle. In some embodiments, 20% of the silver nanoparticles have at least two fractal structures, preferably 30%, 40%, 50%, 60%, 70%, 80%, 90%, or 100%. In some embodiments, an individual nanoparticle can have 2-50 fractal structures, preferably 10-40, or 20-30 fractal structures.

In some embodiments, at least a portion of the silver nanoparticles have at least two different lattice fringes in an individual nanoparticle. In some embodiments, 20% of the silver nanoparticles have at least two different lattice fringes, preferably 30%, 40%, 50%, 60%, 70%, 80%, 90%, or 100%. In some embodiments, an individual nanoparticle can have 2-50 lattice fringes, preferably 10-40, or 20-30 lattice fringes. In some embodiments, 5 types of lattice fringes are in a silver nanoparticle of the present disclosure, further labeled as A, B, C, D, and E in FIGS. 3A-3E. In an embodiment, the lattice fringe is inside the core of the silver nanoparticle. In an embodiment, the lattice fringe is outside the core of the silver nanoparticle. In an embodiment, the silver nanoparticle has lattice fringes both in the core and outside of the core. In an embodiment, the lattices fringes farther from the core contribute to the fractal structures. In an embodiment, fringe A has a d-spacing of 0.18-0.22 nm, preferably 0.19-0.21, or approximately 0.20 nm, corresponds to the [200] lattice structure of silver, and is outside the core of the nanoparticle. In an embodiment, fringe B has a d-spacing of 0.22-0.26 nm, preferably 0.23-0.25, or approximately 0.24 nm, corresponds to the [111] lattice structure of silver, and is outside the core of the nanoparticle. In an embodiment, A and B are in different directions. In an embodiment, fringe C has a d-spacing of 0.22-0.26 nm, preferably 0.23-0.25, or approximately 0.24 nm, corresponds to the [111] lattice structure of silver, and is closer than A or B to the core of the nanoparticle. In an embodiment, fringe D has a d-spacing of 0.22-0.26 nm, preferably 0.23-0.25, or approximately 0.24 nm, corresponds to the [111] lattice structure of silver, and is closer than A or B to the core of the nanoparticle. In an embodiment, C and D are in different directions. In an embodiment, fringe E has a d-spacing of 0.18-0.22 nm, preferably 0.19-0.21, or approximately 0.20 nm, corresponds to the [200] lattice structure of silver, and is closer than A or B to the core of the nanoparticle. In an embodiment, lattice fringes A, B, C, D, and E are all in different directions. In some embodiments, two of the lattice fringes are in the same direction and three are in different directions. In some embodiments, an individual silver nanoparticle has at least one silver lattice structure selected from the group consisting of [111], [200], [311], [222], and [220]. In an embodiment, the mixed orientations of fringes as well as the different lattice structures facilitate the growth of irregular shaped silver nanoparticles with fractal structures. In some embodiments, fractal structures induce and localize strong EM near-fields that facilitate surface-enhanced spectroscopy.

In some embodiments, at least a portion of the silver nanoparticles are twinned. In some embodiments, twinned means that two nanoparticles are coupled. In some embodiments, 10% of the silver nanoparticles are twinned, preferably 20%, 30%, 40%, 50%, 60%, 70%, 80%, 90%, or 100% are twinned. In some embodiments, the twinned nanoparticles are bound by the [111] lattice structures.

In some embodiments, the silver nanoparticles have an optical bandgap of 2.8-2.9 electron Volts (eV), preferably 2.82-2.88 eV, or 2.84-2.86 eV. In some embodiments, the silver nanoparticles have a maximum absorption signal at 350-400 nm, preferably 360-390 nm, or 370-380 nm. In some embodiments, the silver nanoparticles have a maximum fluorescence signal at 420-440 nm, preferably 425-435, or approximately 430 nm.

At step 106, the method 100 includes at least partially coating a substrate with the mixture to form a fluorescence sample. In some embodiments, 20% of the substrate is coated with the mixture, preferably 30%, 40%, 50%, 60%, 70%, 80%, 90%, or 100%. In some embodiments, the fluorophore is adsorbed to at least one silver nanoparticle. In some embodiments, at least 10% of the silver nanoparticles have at least one fluorophore adsorbed, preferably 20%, 30%, 40%, 50%, 60%, 70%, 80%, 90%, or 100%. In an embodiment, at least 10% of the silver nanoparticle surface has a fluorophore adsorbed, preferably 20%, 30%, 40%, 50%, 60%, 70%, 80%, 90%, or 100%.

At step 108, the method 100 includes recording a fluorescence image of the fluorescence sample. In some embodiments, the fluorescence image is taken with a fluorescence microscope, in a process called fluorescence microscopy. In fluorescence microscopy, the sample is illuminated with light of a relatively short wavelength, usually blue or ultraviolet (UV). The sample is examined through a barrier filter that absorbs the short-wavelength light used for illumination and transmits the fluorescence from the sample, which is therefore seen as bright against a dark background. Because fluorescence is observed as luminosity on a dark background, fluorescent constituents of the sample can be seen even in small amounts [Fred Rost, Encyclopedia of Spectroscopy and Spectrometry (Third Edition), 2017, hereby incorporated by reference in its entirety]. Fluorophores can be tailored to target specific areas inside of biological samples, allowing for imaging of tissue dynamics, cells, individual organelles, and macromolecular assemblies inside of cells. Although, this method is applied to fluorescence microscopy, one skilled in the art could apply to any technique requiring surface-enhanced fluorescence.

Figure 5A:
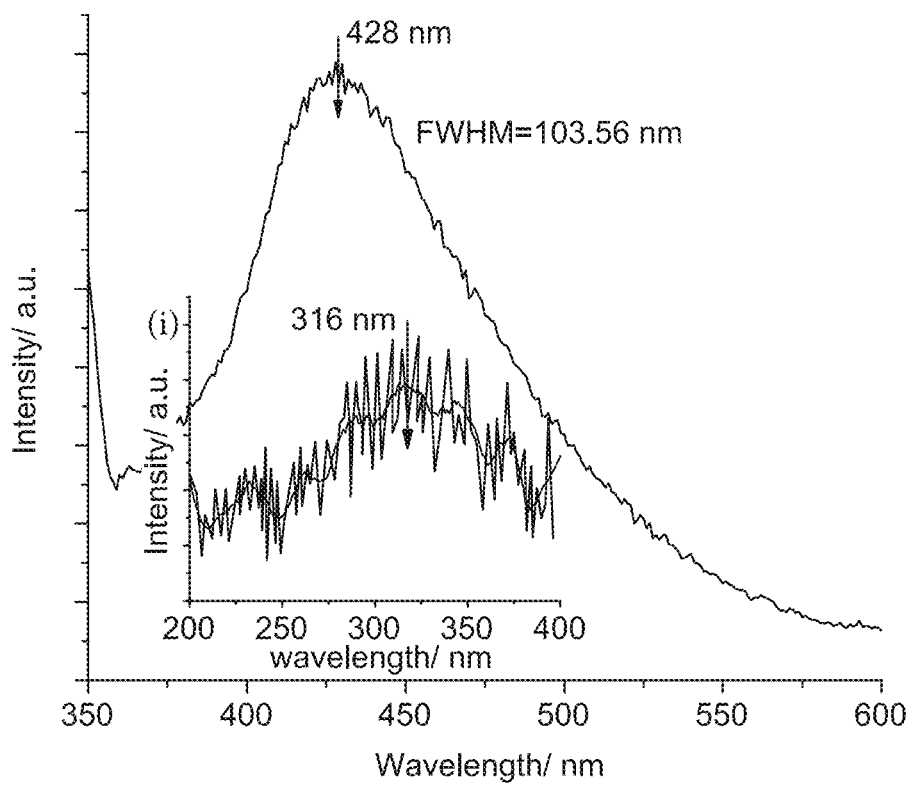
FIG. 5A illustrates a photoluminescence spectrum of an aqueous suspension of as-synthesized silver nanoparticles; inset (i) represents excitation spectrum of the same, according to certain embodiments.
Figure 5B:
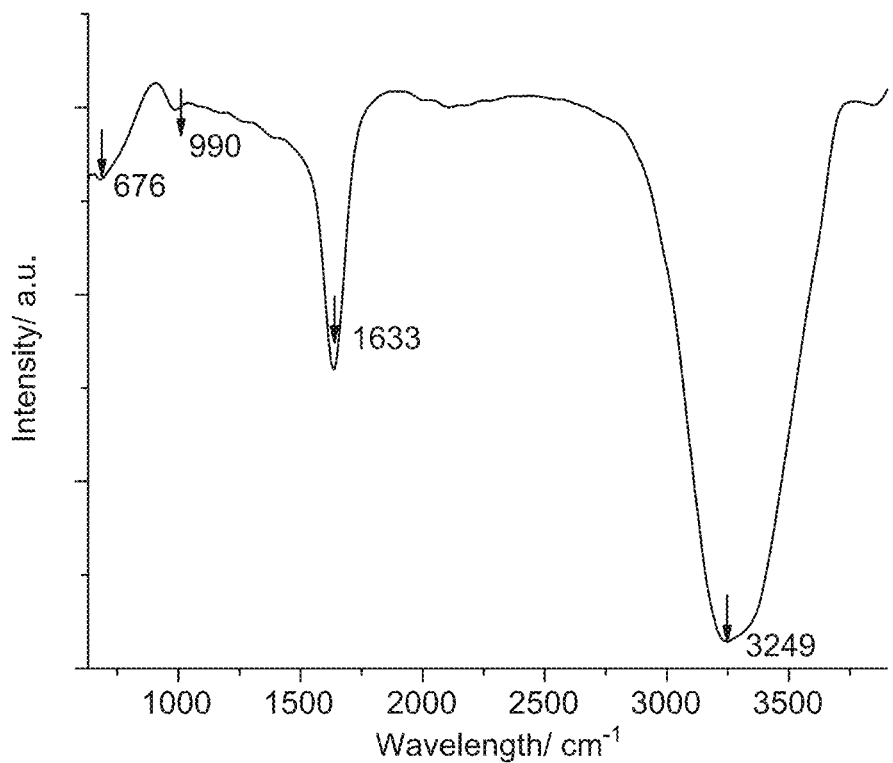
FIG. 5B illustrates a Fourier transform infrared (FTIR) spectrum of an aqueous suspension of as-synthesized silver nanoparticles, according to certain embodiments.
Figure 5C:
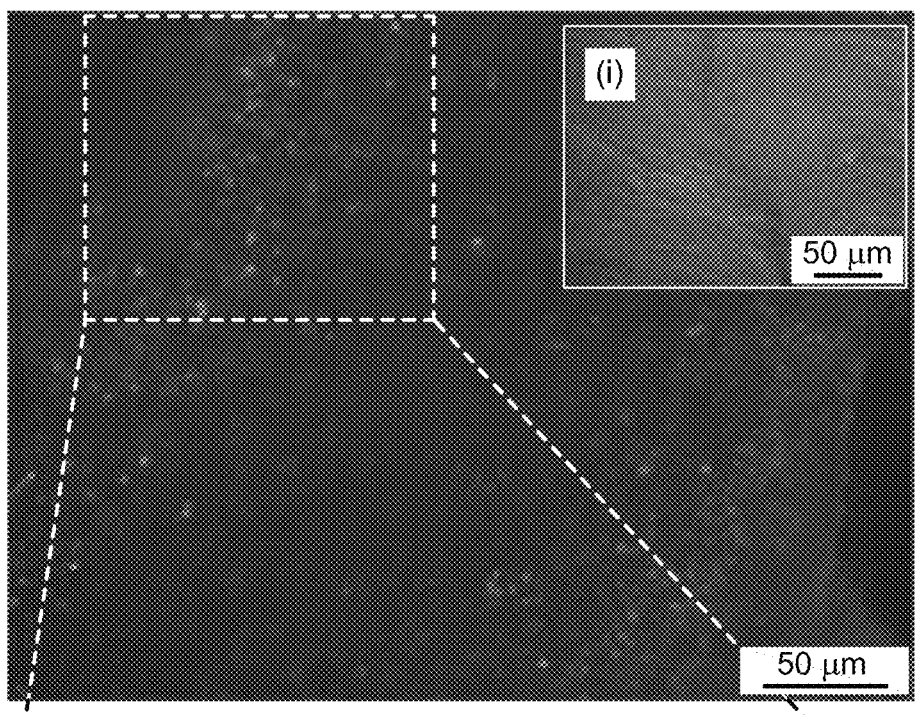
FIG. 5C illustrates a fluorescence microscopic micrograph of rhodamine 6G (R6G) incubated in as-synthesized silver nanoparticles that were immobilized on the glass; inset (i) represents the same micrograph of R6G dispersed on glass only, according to certain embodiments.
Figure 5D:
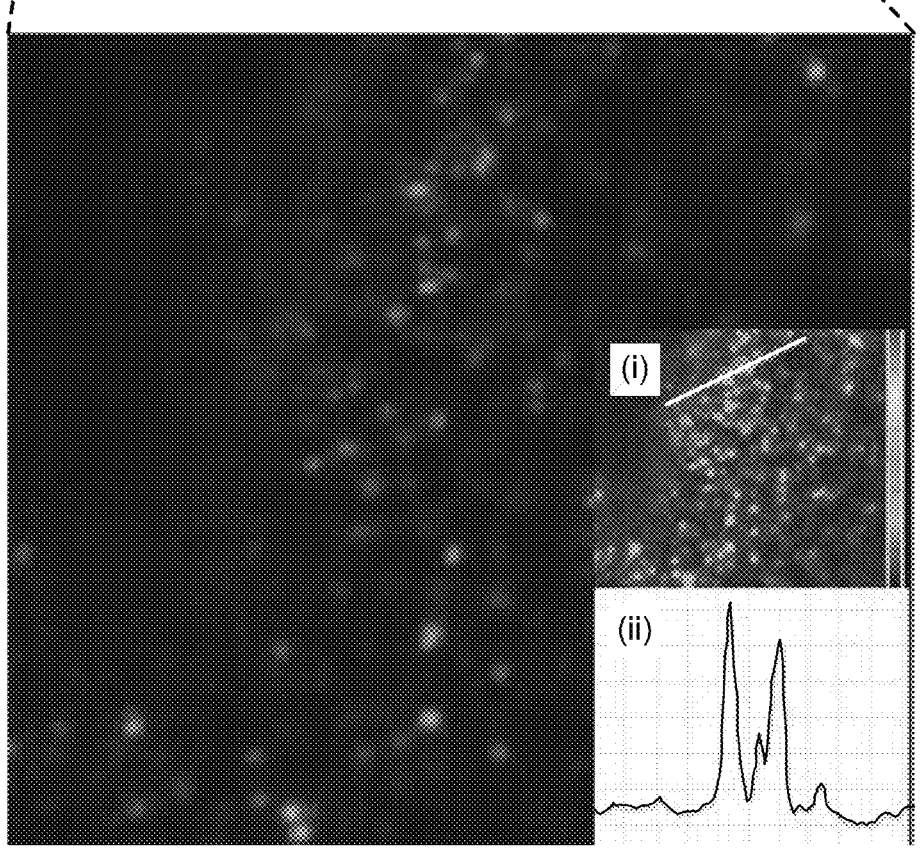
FIG. 5D illustrates a magnified view of a small area (100 micrometers ($\mu$m)×100 $\mu$m) marked as dashed square, inset (i) represents a filtered image of the same indicating bright spots of a surface-enhanced fluorescence (SEF)-active site, R6G-incubated nanoparticles and inset (ii) represents a fluorescence intensity along a white line shown in inset (i), according to certain embodiments.

In some embodiments, the fluorescence image of the fluorescence sample is seen as bright spots on a dark background such as FIG. 5C-5D. In some embodiments, the bright spots are fluorescence from the fluorophore. In some embodiments, a fluorescence image of a fluorescence sample prepared in the same manner but without the silver nanoparticles, has no visible bright spots (FIG. 5C, inset (i)). In some embodiments, a linear section of the fluorescence image (FIG. 5D inset (i)) can be extracted to show the intensity of the fluorescence signal in that section (FIG. 5D inset (II)). In some embodiments, the fluorescence signal of the fluorescence image is higher than the fluorescence signal of the fluorescence image of the fluorophore without the silver nanoparticles. In some embodiments, the fluorescence signal of the fluorescence image is 10 to 10,000 times higher than a fluorescence signal of a fluorescence image of the fluorophore without the silver nanoparticles, preferably 100-1,000 times, or approximately 500 times higher. In some embodiments, the fluorescence image is taken with an advanced fluorescence microscope equipped with a mercury lamp as a UV source. In some embodiments, the fluorescence sample is irradiated with 300-330 nm light to record the fluorescence image, preferably 310-320 nm, or approximately 315 nm light.

In an embodiment, the silver nanoparticles are simulated by FDTD analysis to determine EM near-field distributions. The EM near-fields influence and couple with the excitation of the fluorophores that lead to enhancing fluorescence emission in presence of the silver nanoparticles. In some embodiments, the silver nanoparticles have an electromagnetic field intensity of 6-60 volts per meter (V/m), preferably 10-50 V/m, 20-40 V/m, or approximately 30 V/m.

In nanoparticles-enhanced fluorescence microscopy, the effectiveness of fluorescence emission depends on two main factors: (1) intensity of localized EM field distribution and (2) the distance between the fluorophores and nanoparticles. The fluorescence enhancement factor is directly proportional to the intensity of EM field distribution as well as the spacer thickness. In some embodiments, the irregular shape with the fractal structures of the silver nanoparticles both induces a higher EM field distribution compared to spherical nanoparticles, and also the fractal structures act as a spacer to the fluorophores. In an embodiment, no spacer is added to the surface of the silver nanoparticles other than the inherent fractal structures. In an embodiment, no spacer is added to the surface of the substrates.

A method of making the silver nanoparticles of the present disclosure is also described. The method includes dissolving sodium borohydride ($NaBH_4$) in water at a temperature of 5 to 15 degrees centigrade (° C.), preferably 7-13° C., or approximately 10° C. to form a 1-3 mM, or approximately 2 mM, sodium borohydride stock solution. In some embodiments, the water is deionized water. The method further includes, dissolving silver nitrate ($AgNO_3$) in water at a temperature of 20-25° C., preferably 21-24° C. or 22-23° C. to form a 0.5-2 mM, or preferably 1-1.5 mM silver nitrate stock solution. The method further includes, adding the silver nitrate stock solution dropwise to the sodium borohydride stock solution at a temperature of 5 to 15° C., preferably 7-13° C., or approximately 10° C., to form a silver nanoparticle solution. In some embodiments, the sodium borohydride stock solution and silver nitrate stock solution are added together within 30 minutes, preferably 20 mins, 10 mins, 5 mins, or 1 min of dissolving the sodium borohydride and silver nitrate in water. In some embodiments, the rate of dropwise addition is 1-10 drops per second, preferably 2-8, 3-7, 4-6 or approximately 5 drops per second. In some embodiments, the appearance of yellow color indicates the formation of silver nanoparticles. The method further includes, centrifuging the silver nanoparticle solution and filtering to leave a solid and then washing the solid with water to form the silver nanoparticles. In some embodiments, the silver nanoparticles were pelleted at 20,000 revolutions per minute (rpm) in a high-speed centrifuge.

EXAMPLES

The following examples describe and demonstrate exemplary embodiments of the method 100 of increasing the fluorescence signal of the fluorophore. The examples are provided solely for illustration and are not to be construed as limitations of the present disclosure, as many variations thereof are possible without departing from the spirit and scope of the present disclosure.

Example 1: Materials and Methods

The synthesis of silver nanoparticles is well-known. However, it is challenging to control the size and shape as it starts to develop within the course of the reaction. In the experiment, specific targets to keep the nanoparticles as small and anisotropic as possible for a surface-enhanced fluorescence (SEF) activity was decided. All the chemicals used in the synthesis were received from Sigma-Aldrich. In a typical experiment, silver nanoparticles were synthesized following a revised procedure as mentioned in the Creighton method. In the Creighton method, sodium borohydride ($NaBH_4$) was used as a reducing agent to synthesize silver nanoparticles of small sizes from silver nitrate ($AgNO_3$) precursor solution. However, the balance between surfactant, e.g., $BH_4^-$, and constituent metal ion, e.g., $Ag^+$ in the process of Ag nanoparticles preparation is important. Two fresh stock solutions were prepared before starting the synthesis. Firstly, a fresh stock of 30 ml of 2.0 mM $NaBH_4$ was prepared in deionized (DI) water and placed in ice for 3-5 minutes, and tenderly stirred. Fresh ice-cold $NaBH_4$ should be used to avoid decomposition. Secondly, a fresh stock of 10 mL of 1.0 mM $AgNO_3$ (i.e., 1.7 mg of $AgNO_3$) was prepared in DI water. Now instead of mixing $NaBH_4$ stock solution in $AgNO_3$ stock solution was intentionally mixed as mentioned in the Creighton method, 10 ml of fresh $AgNO_3$ stock solution dropwise in ice-cooled and stirring $NaBH_4$ stock solution. The rate of mixing was kept very slow approximately 4 drops/s. The reverse process and slow rate of $AgNO_3$ stock solution mixing were maintained so that amount of $Ag^+$ increases gradually, while the amount of $BH_4^-$ is kept constant. The sooner the $AgNO_3$ stock solution was added to the $NaBH_4$ stock solution, the yellow color started to show up in the solution and got more concentrated gradually. The as-synthesized silver nanoparticles were pelleted at 20,000 revolutions per minute (rpm) in a high-speed centrifuge (HERMLE Labortechnik•Zentrifugen: Z 32 HK). The precipitated and dense portion from the bottom was collected and dispersed again in DI water to remove unreacted $Ag^+$. The samples were stored at ~5° C. till further use.

Example 2: UV-Vis Absorption Characterization

An Ultraviolet-visible (UV-vis) absorption of as-synthesized silver nanoparticles was carried out using JASCO UV-VIS-NIR Spectrophotometer (V-670) measurement system. Topographic characterizations were carried out by using an advanced field emission transmission electron microscope TEM (JEM-2100F Transmission Electron Microscope by JEOL USA), and further details to understand crystal growth and d-spacing were resolved by high-resolution TEM (HRTEM), selected area (electron) diffraction (SAED) pattern, and d-spacing calculation. A photoluminescence emission and excitation characteristics were recorded using the Horiba Spectrofluorometer (Fluorolog®-3 HR320 with slit width of 2 nanometers (nm), and open quartzes cuvettes path length of 1 centimeter (cm)×1 cm) measurement system before to SEF measurement, a Fourier transforms infrared (FTIR) absorption measurements were carried to investigate the functional groups available at the surface of as-synthesized silver nanoparticles so that the origin of enhanced fluorescence emission is clearly understood. The specimens were scanned over the range of 400 to 4000 ($cm^{-1}$) using a Thermo Scientific FT-IR spectrometer (NICOLET 6700) measurement system. As-synthesized silver nanoparticles were incubated with a 1 micromolar (µM) solution of target fluorophores (Rhodamine (R)6G as received from Sigma-Aldrich) for 15 minutes and thereafter immobilized on a glass substrate for SEF microscopy. The fluorescence images of Rhodamine 6G (R6G) incubated silver nanoparticles on glass and R6G on glass only were recorded via an advanced fluorescence microscope (Nikon Eclipse Ti) equipped with a mercury lamp as a UV source.

Example 3: EM Near-Field Distributions Characterization

The EM near-field distributions were considered a crucial and deterministic factor in SEF strategy. Therefore, a typical model SS3C was designed and simulated by Planc Finite-Difference Time-Domain (FDTD) (ver. 6.2). Based on experimental observation, excitation was chosen to be 385 nm and normal to the XY plane. To understand EM near-field distributions of such model, polarizations of incident excitation were selected to be s- and p-polarization in addition to the one more at 45°. Based on the HRTEM observation, the spheroid was kept 6 nm in diameter. The three cones were positioned in such a way so that each one lays on the x-, y-, and z-axis. Each cone was 4 nm long with a 3 nm base. Further insight into the EM near-field distributions was extracted in three different plans, such as XY (Z=0)-, YZ (X=0)-, and ZX (Y=0)-planes. The individual elements, such as spheroid and cone of the dimensions and parameters, were further simulated and referred to as a reference to those as observed in the SS3C model.

Example 4: Nanoparticle Characterization

Figure 2A:
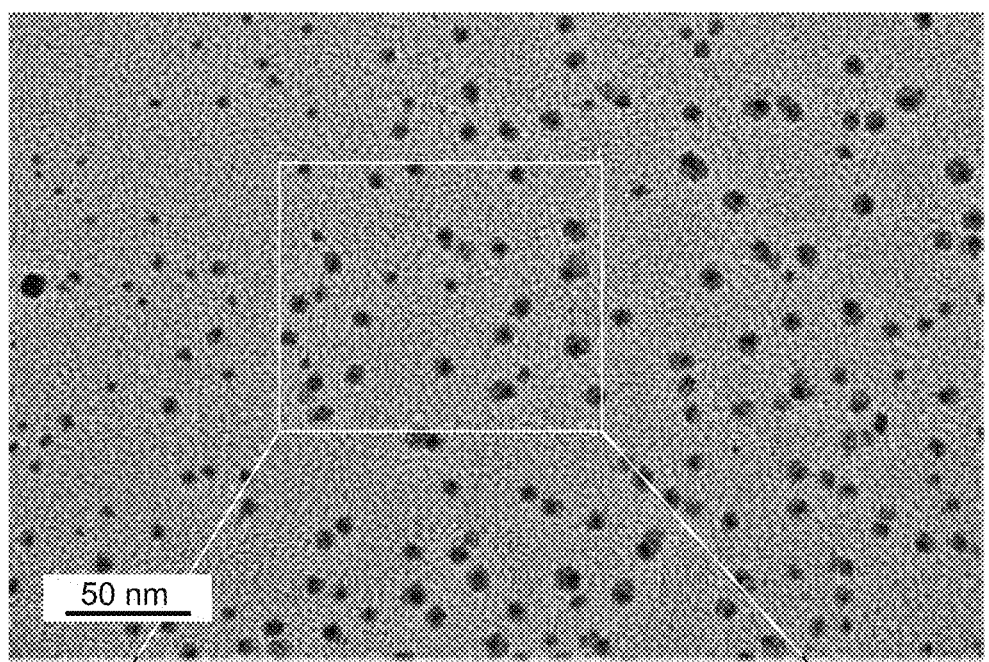
FIG. 2A illustrates a transmission electron microscope (TEM) micrograph of as-synthesized silver nanoparticles, according to certain embodiments.
Figure 2B:
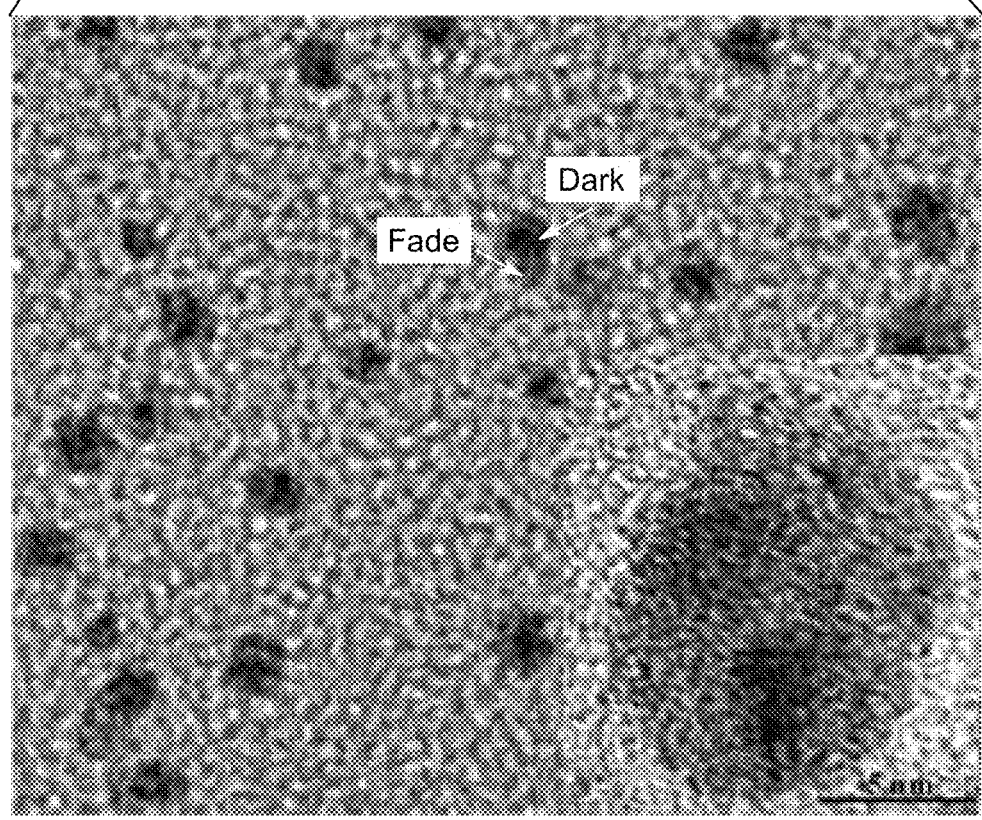
FIG. 2B illustrates an enlarged view of a rectangular portion as marked in FIG. 2A, dark and faded faces are marked therein inset represents a high-resolution TEM image of a typical silver nanoparticle surrounded by a black dotted boundary, according to certain embodiments.
Figure 2D:
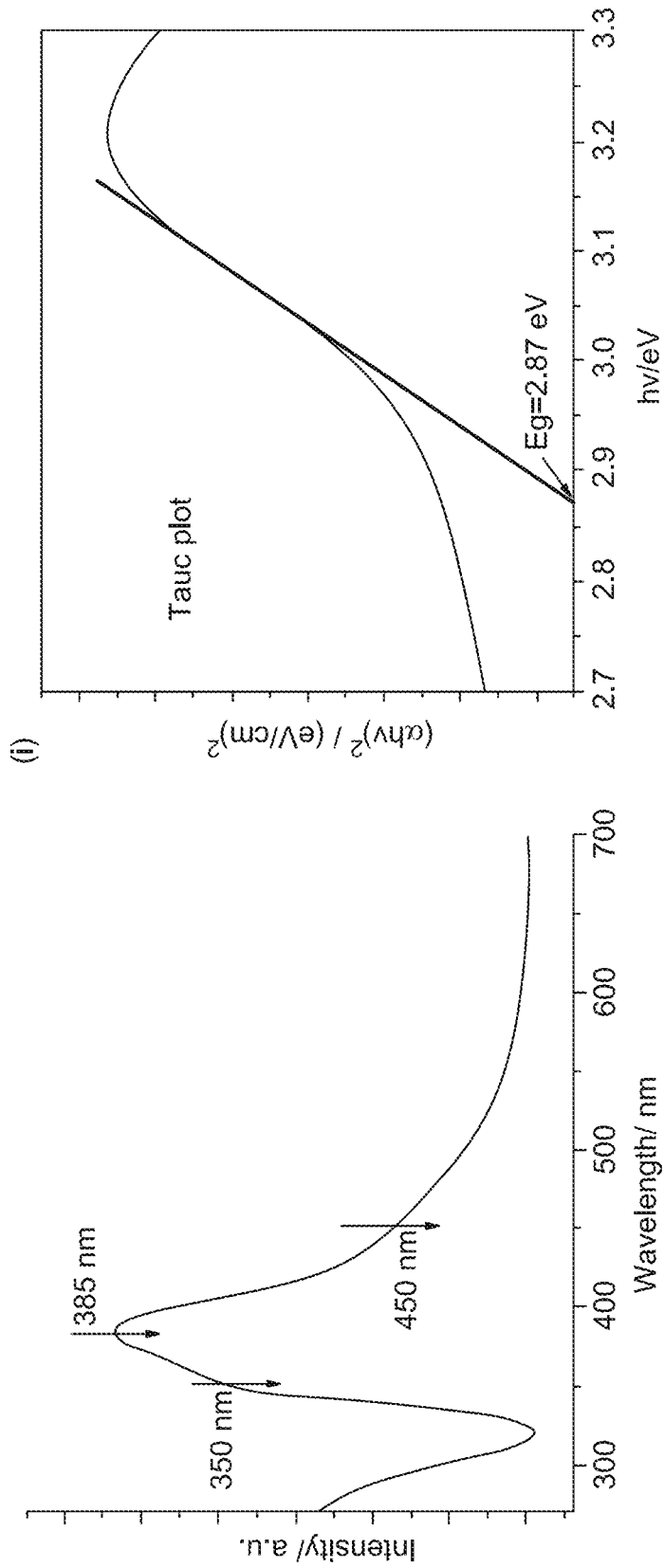
FIG. 2D illustrates an ultraviolet-visible (UV-vis) absorption spectrum confirming a distinct peak at 385 nm in addition to two shoulder peaks at 350 and 450 nm, inset (i) represents Tauc plot of the same revealing a bandgap at 2.87 electron volts (eV), according to certain embodiments.

Due to the inherent features and fractal-like nanostructure, SEM observations were not that fruitful. A consistent effort was carried out to find out morphological details of as-synthesized silver nanoparticles, but to no avail. FIGS. 2A-2D illustrate TEM and HRTEM investigations that were further employed. FIG. 2A represents a typical micrograph of as-synthesized silver nanoparticles. None of the nanoparticles were found spherical; instead, two faces in each individual were noted as shown in FIG. 2B. A zoom-in view of the rectangle marked in FIG. 2A is shown in FIG. 2B. A typical nanoparticle has dark and faded faces marked by white arrows therein. The inset of FIG. 2B shows a high-resolution TEM micrograph of such a typical nanoparticle with an approximate boundary drawn by a black dotted line. FIG. 2C illustrates a size distribution of these nanoparticles which confirmed broad distribution of the sizes indicating the maximum number of nanoparticles of 6 nm in diameter. A Gaussian fit of such distribution is shown as a black line in FIG. 2C further revealed a full-width half maximum (FWHM) of 2.06 nm. The as-synthesized silver nanoparticles were found highly monodispersed in water, probably because of their small sizes, anisotropic shapes, and a bit yellowish as shown in inset (i) of FIG. 2C. Inset (i) of FIG. 2C represents the suspension of as-synthesized particles dispersed in DI water. UV-vis absorption measurements of such aqueous specimen pointed out a distinct peak at 385 nm along with two additional shallow shoulder peaks at 350 and 450 nm as shown in FIG. 2D. Such indication of several absorption peaks led us to investigate further so that the as-synthesized silver nanoparticles is useful in potential applications. A Tauc plot was drawn, and the bandgap of as-synthesized Ag nanoparticles was estimated as mentioned in inset (i) of FIG. 2D. The bandgap of the as-synthesized Ag nanoparticles was found to be 2.87 eV which corresponded to 432 nm.

Figure 3A:
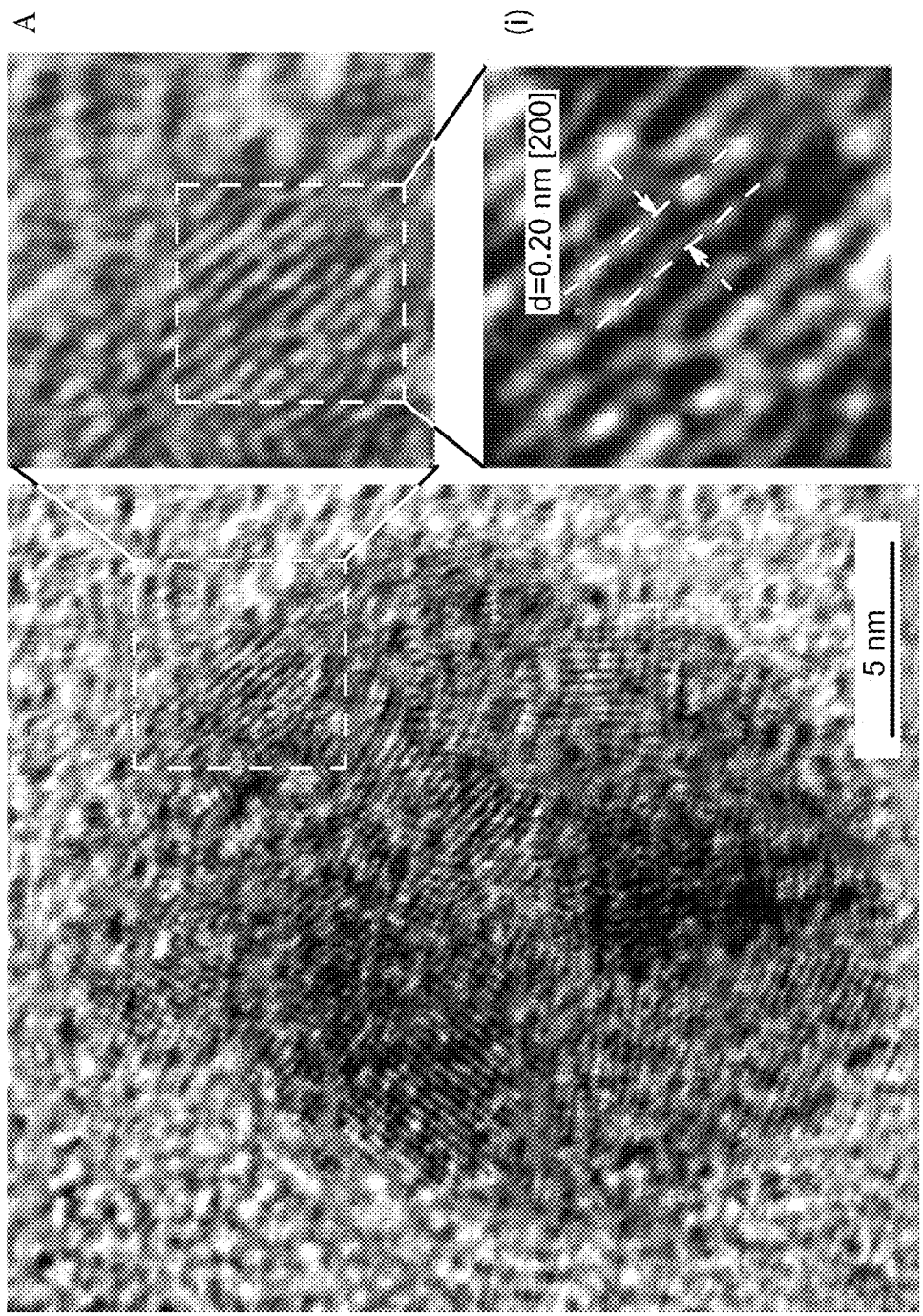
FIGS. 3A-3E illustrate a high-resolution TEM of a typical arbitrary-shaped silver nanoparticle indicating a mixer of atomically resolved lattice fringes; 5 typical fringes from 5 different spots zoomed-in further as marked therein by white dashed squares (pointed hereby "A," "B," "C," "D," and "E"). (A-E) Zoom in views (3 nanometers (nm)×3 nm) of sites "A," "B," "C," "D," and "E" confirming fringes at different directions with different d-spacing, respectively; insets (i)-(v) represent fringes with d-spacing 0.20, 0.24, 0.24, 0.24, and 0.20 nm for sites "A," "B," "C," "D," and "E," respectively. The scale bar represents the size of the micrograph.
Figure 3B:
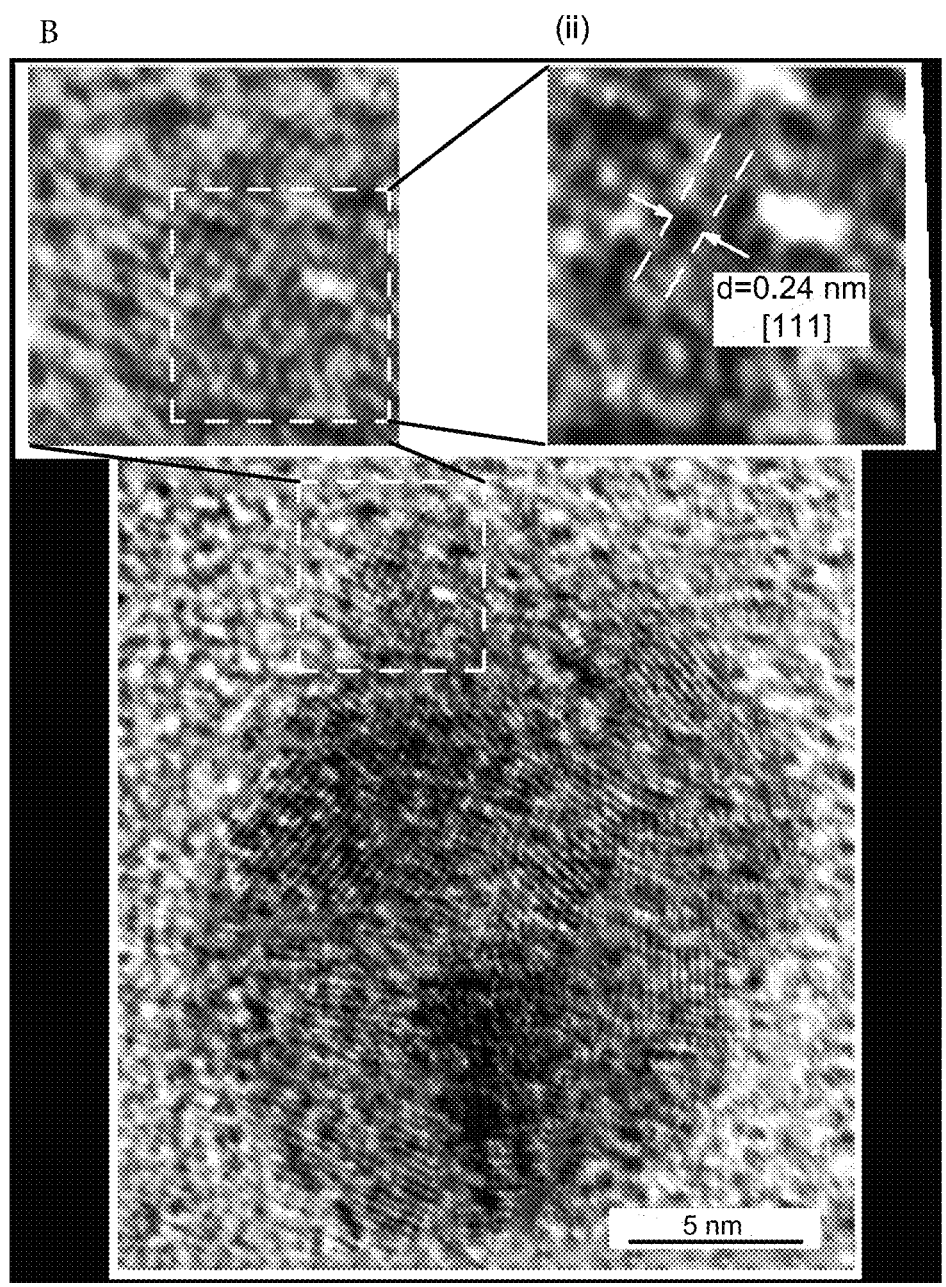
Figure 3C:
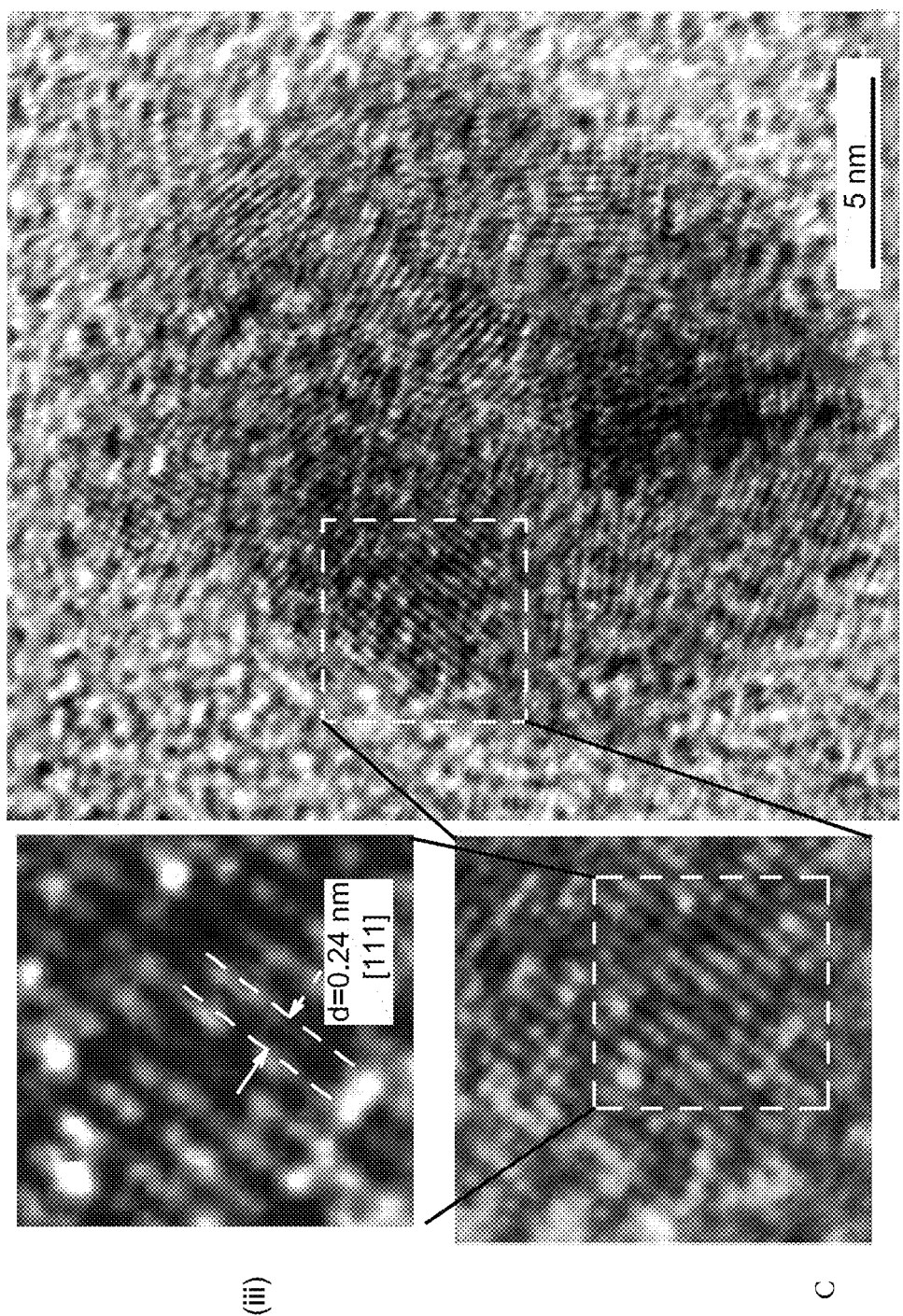
Figure 3D:
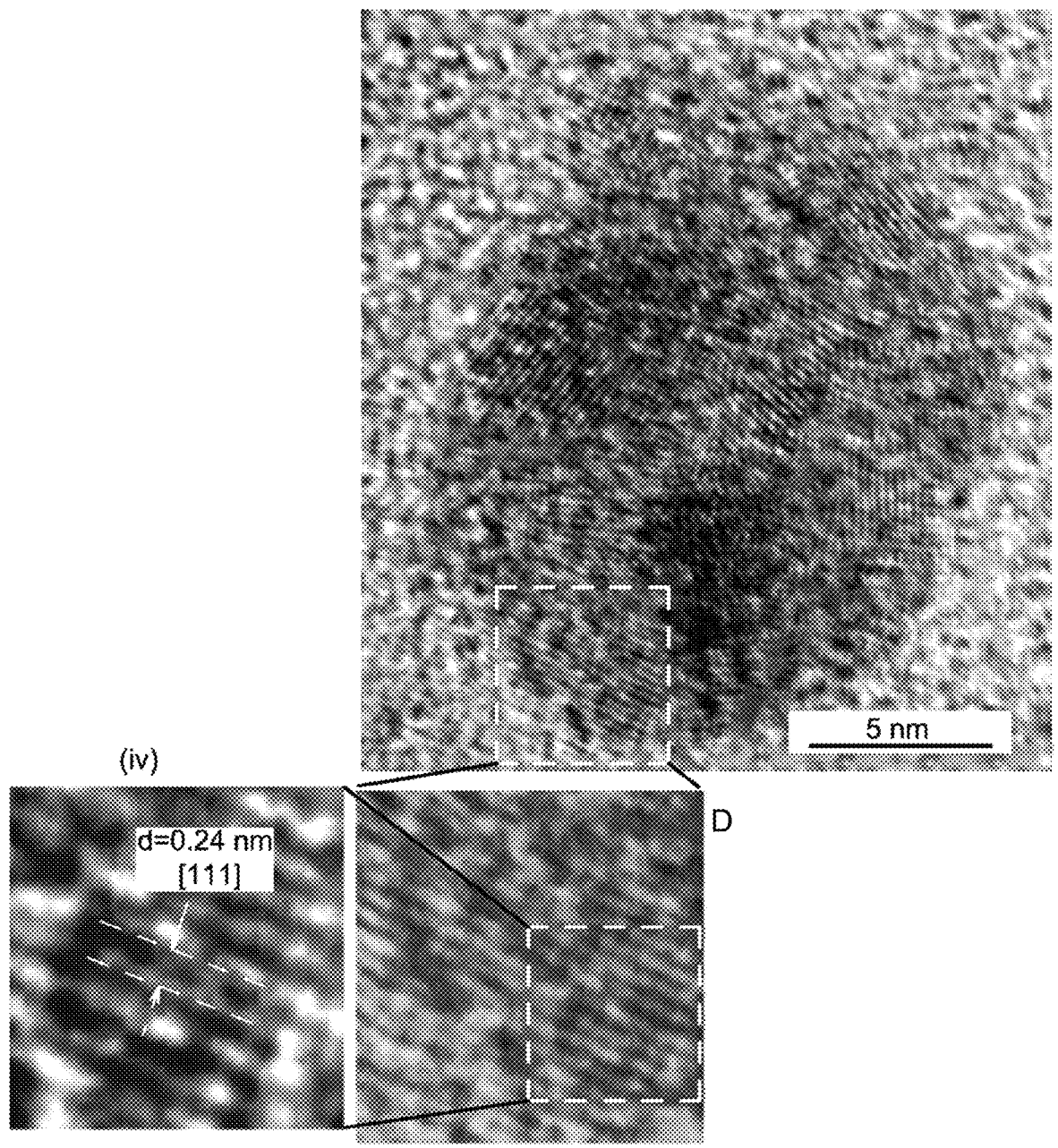
Figure 3E:
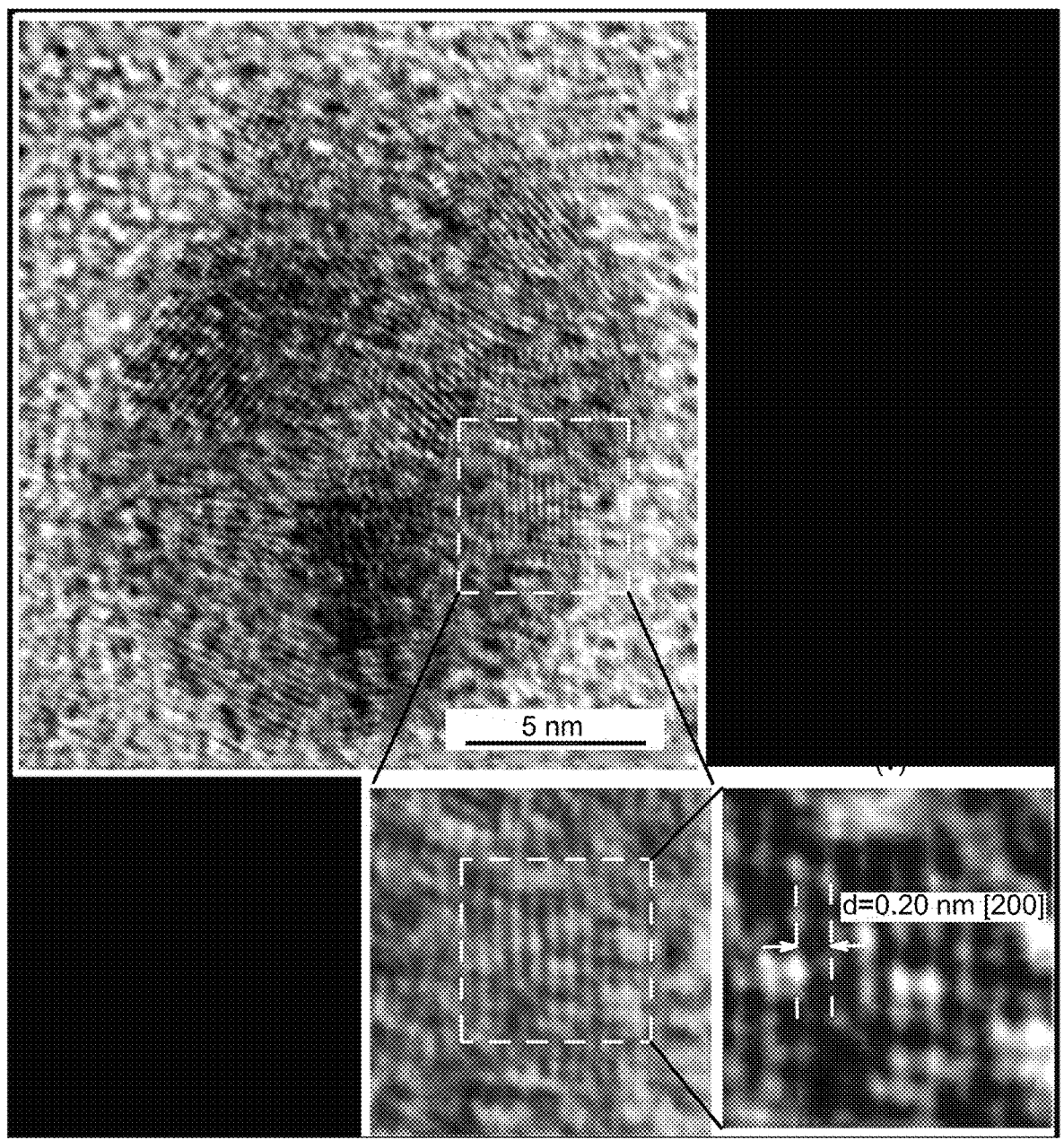

To understand further the nanoscale features such as dark and fade faces as well as the origin of multiple absorption peaks, high-resolution TEM observations along with SAED pattern and d-spacing identifications were carried out. FIGS. 3A-3E represent a typical HRTEM micrograph of as-synthesized arbitrary-shaped silver nanoparticles. It was strikingly noted that the nanoparticles were having fringes of different directions and d-spacing. Five typical sites were elaborated as an example. A white dashed square marked therein as "A" is shown on the right. As shown in inset (i) of FIG. 3A at the below right, clear fringes were observed along with d-spacing of 0.20 nm that coincided well with [200] lattice structure according to standard crystallography of silver (JCPDS 4-0783). FIG. 3B illustrates a white dashed square marked therein as "B" is shown at the top. Unlike site "A," fringes were found to be in different directions. As shown in inset (ii) of FIG. 3B, clear fringes were observed along with d-spacing of 0.24 nm that coincided well with [111] lattice structure according to standard crystallography of silver (JCPDS 4-0783). These two sites, "A" and "B" along with some other surrounding sites, were grown outside the core of the nanoparticles and therefore were thought to contribute to developing fractal-like nanostructures. Unlike those at site "A" and site "B," in FIG. 3C, a regular and consistent fringe was observed in site "C" as marked therein by a white dashed square and is shown in the left pane. As shown in inset (iii) of FIG. 3C, site "C" confirmed fringes with d-spacing of 0.24 nm that corresponded to [111] lattice structure, a common crystal growth structure according to standard crystallography of silver (JCPDS 4-0783). FIG. 3D represents a white dashed square marked therein as "D" which is shown in the bottom left. As shown in inset (iv) of FIG. 3D at the below left, clear fringes were observed along with d-spacing of 0.24 nm that coincided well with [111] lattice structure according to standard crystallography of silver (JCPDS 4-0783). Concerning those observed at site "C," fringes were found to be in different directions, although both sites were having crystal lattices of [111]. FIG. 3E represents another site "E" as marked by a white dashed square shown in the bottom right. As shown in inset (v) of FIG. 3E at the below right, clear fringes were observed along with d-spacing of 0.20 nm that coincided well with [111] lattice structure according to standard crystallography of silver (JCPDS 4-0783). Unlike those fringes observed in sites," (FIG. 3A) "B," (FIG. 3B) "C," (FIG. 3C), and "D," (FIG. 3D) the fringes at site "E" (FIG. 3E) were noted to be in a different direction. In most of the cases, fringes were found to be in a different direction on but with [111] crystal structure and d-spacing of 0.24 nm. Such mixed orientations of fringes, as well as different lattice structures, facilitate the growth of arbitrary-shaped silver nanoparticles. Hence, such fractal-like nanostructures maybe responsible for surface plasmon resonance (SPR)-mediated localized EM near-field distributions and thus contribute to SEF microscopy. Indeed, as-synthesized arbitrary-shaped silver nanoparticles were found to be very active in SEF measurements as well as in generating localized EM field distributions as elaborated in the later part of the text.

Figure 4A:
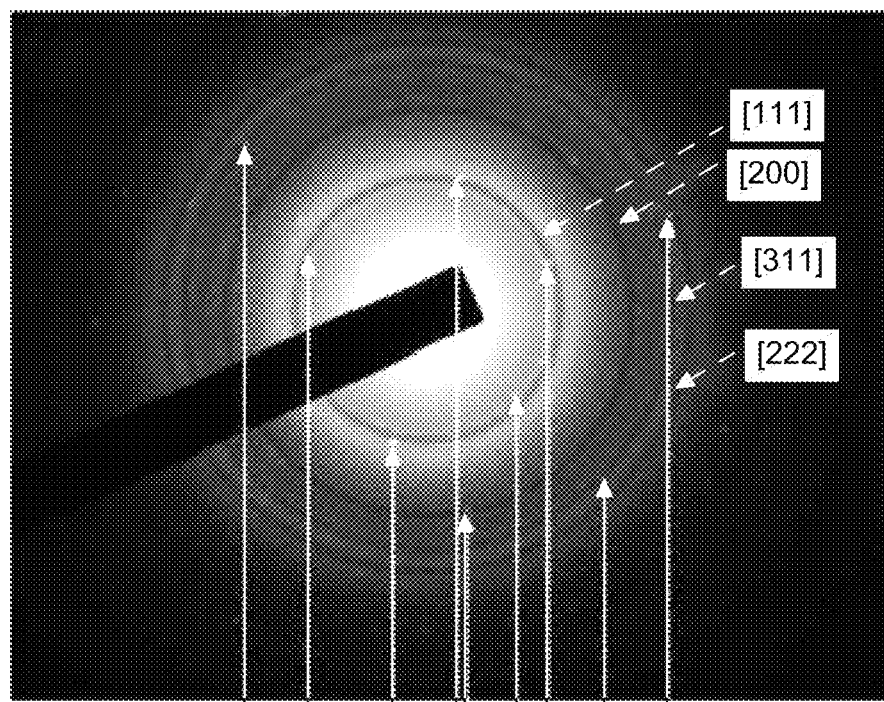
FIG. 4A illustrates a small, selected area electron diffraction (SAED) pattern of as-synthesized silver nanoparticles; shadow rings correspond to diffraction rings for [111], [220], [311], and [222] planes, according to certain embodiments.

As observed above, individual silver nanoparticles contained fringes of different directions as well as of different d-spacing that correlated to different crystal structure growth within the same nanoparticles. In this connection, FIGS. 4A-4D illustrate crystallographic details of a small area SAED pattern of such nanoparticles. FIG. 4A represents the SAED pattern of as-synthesized silver nanoparticles along with rings that corresponded to different lattice planes. The as-synthesized silver nanoparticles appeared to be of good crystallinity and of having a strong presence of bright spots in the SAED pattern.

Figure 4B:
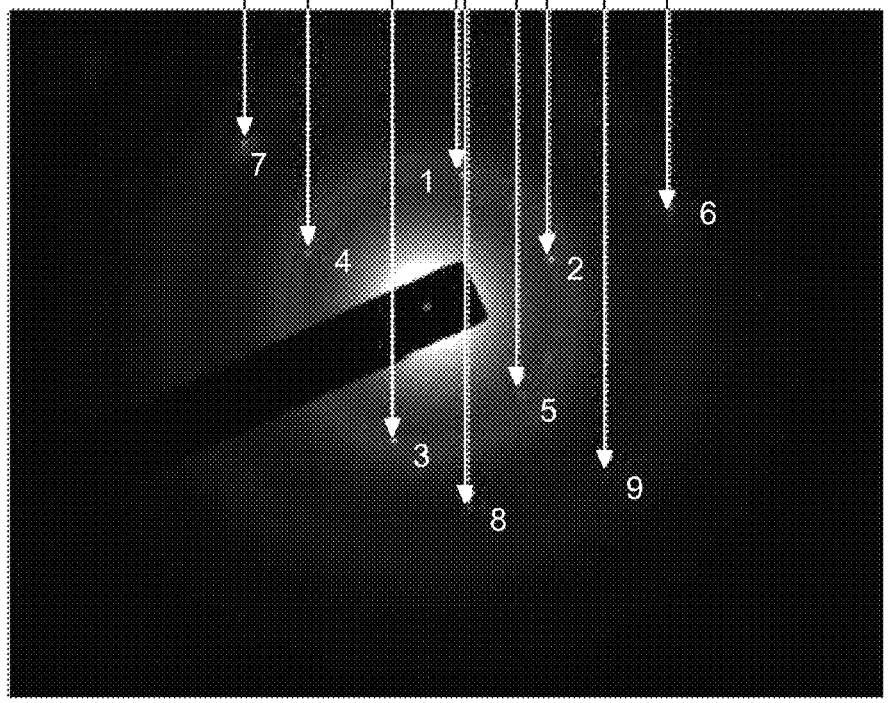
FIG. 4B illustrates nine selected bright spots within the diffraction rings to estimate d-spacing and amplitude counts, according to certain embodiments.
Figures 4C, 4D:
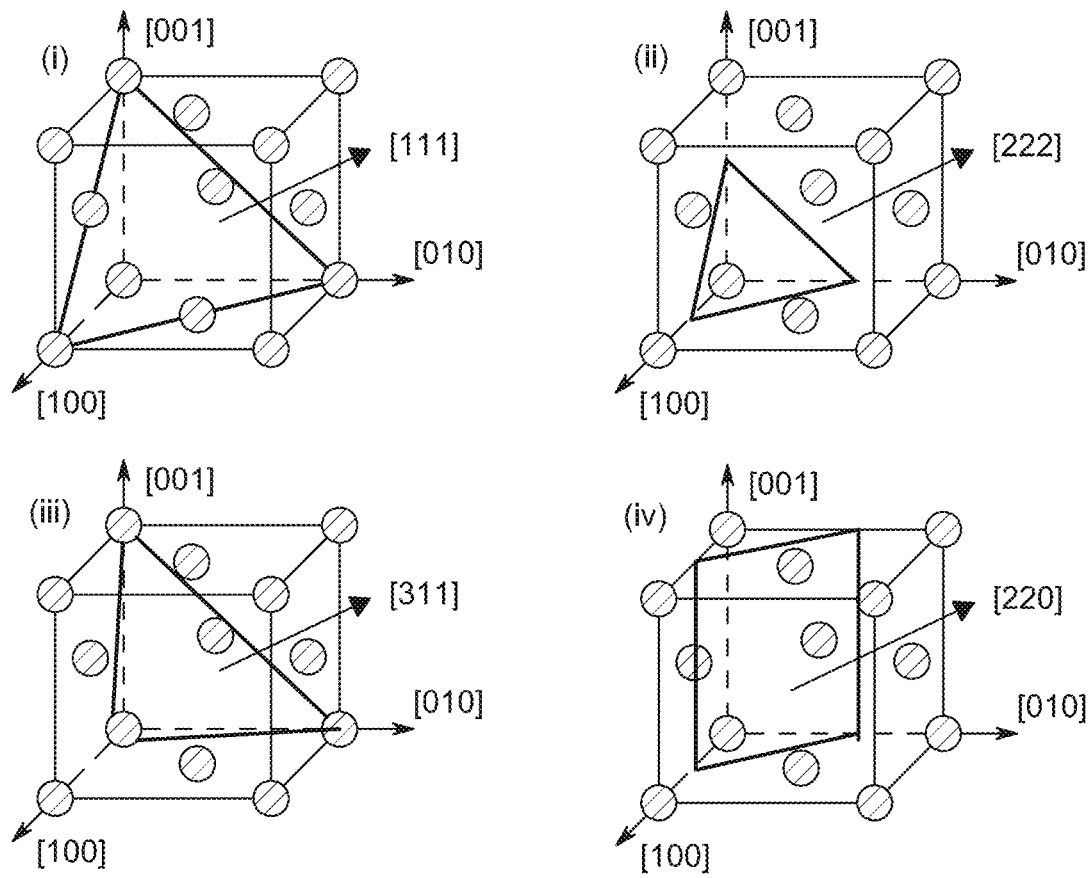
FIG. 4C illustrates a list of d-spacing and amplitude counts and corresponding planes according to certain embodiments.
FIG. 4D illustrates pictorial representation of [111], [311], [222], and [220] planes; insets (i)-(iv) demonstrate the arrangement of a silver atom for corresponding planes, according to certain embodiments.

Four typical diffraction rings marked with shadow rings therein represent [111], [220], [311], and [222]. According to standard crystallography of silver (JCPDS 4-0783), the positions of these rings were found consistent with the d-spacing and coincided well with the face-centered cubic (fcc) phase of silver. Nine bright spots of the SAED pattern were picked up further to estimate d-spacing and their corresponding amplitudes as shown in FIG. 4B. The dotted lines with double-sided arrows were just to guide one to correlate bright spots in SAED patterns between FIGS. 4A-4B. The d-spacing and corresponding amplitudes of such nine spots are listed in FIG. 4C. As noted, the two brightest spots with 13,316.16 and 10,811.51 counts corresponded to [111] lattice plane of d-spacing 0.2233 and 0.2314 nm, respectively, as per referenced d-spacing card (JCPDS 4-0783). Out of nine spots, five were found to be in the [111] plane, whereas two with 1424.87 and 1102.75 counts corresponded to the [311] lattice plane. Amongst many others, two more spots in the SAED pattern were identified with 1507.64 and 948.46 counts that corresponded to [222] and [220] lattice planes as per the standard d-spacing card of silver. In the above context, FIG. 5D shows four planes as observed in SAED pattern and represents [111], [311], [222], and [220] planes. Insets (i)-(iv) of FIG. 4D demonstrates the arrangement of silver atoms for each of the above-mentioned corresponding planes. The observation extracted from the SAED pattern of silver nanoparticles revealed the fact that on the nanometer scale, silver nanoparticles tended to nucleate and grow into twinned and multiply twinned features with their fractal-like surfaces bounded by the lowest-energy [111] lattice structures. Such fractal-like and nanometric metal particles, particularly noble metal nanoparticles, are known to induce and localize strong EM near-fields that will facilitate surface-enhanced spectroscopy such as fluorescence, Raman, and photoluminescence.

Example 5: Nanoparticles-Enhanced Fluorescence Microscopy Characterization

In nanoparticles-enhanced fluorescence microscopy, it is well-known that the effectiveness of fluorescence emission depends on two main factors: (1) the intensity of localized EM field distribution and (2) the distance between the fluorophores and nanoparticles. The fluorescence enhancement factor was found to be directly proportional to the intensity of EM field distribution as well as the increase in spacer thickness. An effective system for enhanced fluorescence microscopy and plasmon active nanoparticles is usually coated with a layer embedded with fluorophores or a layer decorated with fluorophores. In such a scenario, nanoparticles contribute to inducing the localized EM field, and the coating layer function as the spacer. However, the coating layer disturbs the EM field distribution as well as perturbs the fluorescence emission from the fluorophores. A fractal-like and arbitrary-shaped noble metal nanoparticles system is more suitable for fluorescence microscopy, as such arbitrary-shaped nanoparticles not only induce higher EM field distribution compared to that obtained in spheroid but also their fractal-like nanostructures function as a spacer to fluorophores. Hence, the as-synthesized arbitrary-shaped silver nanoparticles were thought to have strong fluorescence as well as responsible for higher EM near-field distribution. Indeed, a strong enhancement in fluorescence of R6G as fluorophores was observed in presence of such arbitrary-shaped silver nanoparticles. The photoluminescence emission of as-synthesized silver nanoparticles was recorded with a peak at 428 nm along with an FWHM of 103.56 nm as shown in FIGS. 5A-5D. According to the excitation spectrum as shown in the inset of the FIG. 5A, 316 nm was selected as excitation energy for photoluminescence measurements.

Example 6: FTIR Characterization

FIG. 5B represents the FTIR spectrum of as-synthesized silver nanoparticles. FTIR analysis was carried out to investigate the functional groups available at the surface of as-synthesized silver nanoparticles so that the origin of enhanced fluorescence emission can be clearly understood. The FTIR spectrum of silver nanoparticles was recorded in the wavenumber ranges of 4000-400 cm$^{-1}$. It is strikingly noted that only two strong absorption peaks were observed along with a few shallower peaks. The peak at 3249 cm$^{-1}$ represents O—H stretching mode which is because of the strong interaction of water with the surface of silver nanoparticles. The other strong absorption peak at 1633 cm$^{-1}$ represents the presence of $NO_2$ which could be from $AgNO_3$ solution, the metal precursor used in the synthesis of silver nanoparticles. Two more shallow peaks at 990 and 676 cm$^{-1}$ may represent C—O stretching vibrations and C—H out of plane bending vibrations, respectively. The origin of such weak peaks could be from negligible impurity in the mixer.

FIG. 5C depicts a micrograph of fluorophores (i.e., R6G) incubated as-synthesized silver nanoparticles, and the image was captured using an advanced fluorescence microscope. The specimens were loaded at the bottom the of observation dish, and a continuous UV source fa rom mercury lamp was used as excitation to record the fluorescence emission. It is noteworthy that bright spots observed therein indicated the nanoparticles-enhanced fluorescence of R6G dyes. Homogenous emission of fluorescence from fluorophores, R6G as shown in the inset of FIG. 5C, represents the same micrograph of R6G only without any nanoparticles. A zoom-in view of nanoparticles-enhanced fluorescence of R6G as marked by the dashed square in FIG. 5C is shown in FIG. 5D. A filtered image of the same with increased contrast by 50% as shown in inset (i) of FIG. 5D reflected the active sites for nanoparticles-enhanced fluorescence. Inset (ii) of FIG. 5D represents a line profile along the white line as shown in inset (i) of FIG. 5D. The fluorescence enhancement in presence of nanoparticles was found to be several orders of magnitude higher with reference to those without nanoparticles. As explained above, such arbitrary-shaped fractal-like silver nanoparticles were thought to keep the fluorophores a bit away from the core as well as induce giant EM near-field distributions that play important role in nanoparticles' enhanced fluorescence emission.

Example 7: FDTD Characterization

FDTD analysis was carried out to understand EM near-field distributions in presence of an arbitrary shaped silver nanoparticle, as SEF mechanism relies heavily on such EM near-field distributions. A typical model SS3C as shown in FIG. 6A was used in this regard. The model was designed in such a way so that it resembles a bit to the nanoparticles under experiment, although it was quite hard to identify exact morphology of the nanoparticles. The dimension and nature of the selected model were chosen as mentioned therein to facilitate an insight how EM near-field distributions get induced because of excitation at different polarization. Three cones of 4 nm height with 3 nm base each were positioned along x-, y-, and z-axes keeping the core as a spheroid of 3 nm radius. The excitation wavelength was chosen to be 385 nm based on the experimentally obtained absorption band of the silver nanoparticles under the experiment. FIG. 6B represents EM near-field intensity of 12.29 V/m was found to be at YZ (X=0). FIGS. 6C-6D represent EM near-field distributions at s-polarization at different planes. Maximum EM near-field intensity of 23.07 V/m was found to be at XY (Z=0) plane with wider distribution along the surface of a cone as well as at one edge of the spheroid. At ZX (Y=0)-plane, the EM near-field distribution was found wide along the surface of a cone as well as at one edge of a spheroid although the maximum intensity ($E_{max}$=14.6V/m) was almost half of that observed at XY-plane. At YZ (X=0)-plane, EM near-field intensity was found to be the lowest (E=12.29 V/m), nearly half of the XY plane and distributed only at the edges of the spheroid. The reason to highlight EM near-field distributions in all three planes was to understand the three-dimensional scenario, as the fluorophores adsorbed on all over the surface of such arbitrary-shaped silver nanoparticles will get influenced by such EM near-field distribution simultaneously. It is noteworthy that at s-polarization excitation, such arbitrary-shaped silver nanoparticle induces a strong and wider distribution of EM near-field that will play a crucial role in enhancing fluorescence emission. FIGS. 6E-6F shows the same distributions at XY-plane only for spheroid and cone elements, respectively, as references. For spheroid, the maximum intensity ($E_{max}$16.5 V/m) was found reasonably high but less than that obtained in FIG. 6C and distributed at two edges, whereas lower EM near-field intensity ($E_{max}$=6.67 V/m) with wide distribution along the surface of the cone was observed. Insets of FIGS. 6E-6F represent the models used in this case as spheroid and cone, respectively.

The same model SS3C as used in FIG. 6A was further investigated for excitation of p-polarization. FIG. 7A shows the model along with the into wavelength of 385 nm at p-polarization indicated by the black arrow therein. EM near-field distributions at different planes were shown in FIGS. 7B-7D. It is noteworthy that unlike s-polarization of excitation, all the three planes had almost the same maximum EM near-field intensity ($E_{max}$14.47 V/m for XY-plane and YZ-plane, $E_{max}$10.26 V/m for ZX-plane). At XY (Z=0)- and YZ (X=0)-planes, EM near-field distributions were a bit wide and distributed along the surface of the cone and one edge of the spheroid, where such EM near-field distribution at the ZX-plane was near the two edges of the spheroid only. In such a scenario, fluorophores will get less EM near-field influence and therefore emission will be lower compared to that obtained at s-polarization provided that the distance between fluorophores and nanoparticles remains the same. FIGS. 7E-7F shows the same distributions at XY-plane only for spheroid and cone elements, respectively, as references. For spheroid, the maximum intensity ($E_{max}$=16.5 V/m) was found reasonably high and higher than that observed in FIG. 7C and distributed wide along the surface. On the other hand, very strong EM near-field intensity ($E_{max}$=49.16 V/m)

mostly localized at the bottom edges of the cone was observed. Insets of the FIGS. 7E-7F represents the models used in this case as spheroid and cone, respectively.

For the third case, where the excitation was chosen to be of 45° polarization and in such scenario, the three cones of the model will be out of the plane to the excitation. The same model was used in FIG. 6A and FIG. 7A was considered in this simulation and shown in FIG. 8A. A black arrow in FIGS. 8A-8F represent the direction of excitation polarization (45°). FIGS. 8B-8D represent EM nearfield distributions at excitation of 45°-polarization at different planes. Contrary to those observed in s- and polarizations, at XY (Z=0) plane, EM near-field distribution was found to be wider along the surface of both cones as well as at the edge of the spheroid with a maximum intensity of 16.96 V/m. Similarly, at YZ (X=0)- and ZX (Y=0)-planes, the EM near-field distributions were found wide along the surface of a cone as well as at the edge of the spheroid. The maximum intensity ($E_{max}$=13.02 V/m) for both planes was a bit low compared to that observed at XY-plane. In such a scenario, the maximum EM near-field intensity was moderate, but most importantly, such EM near-field distribution was wider compared to those obtained at s- and p-polarizations. Therefore, the EM near-field distribution was thought to influence more fluorophores absorbed at the surface of such nanoparticles and facilitate enhanced fluorescence emission. FIGS. 8E-8F shows the same distributions at XY-plane only for spheroid and cone elements, respectively, as references. For spheroid, the maximum intensity ($E_{max}$15.07 V/m) was found reasonably high but a bit less than that obtained in FIG. 6C and FIG. 7C. The inset of FIG. 8E shows the spheroid used as the model in this simulation. In the case of the cone as shown in FIG. 8F, the maximum EM near-field intensity was still very high, and distribution is confined mostly at the bottom edges of the cone. A solid cone used as the model is shown as inset therein.

Arbitrary-shaped silver nanoparticles in the dimension of ~6 nm were synthesized and characterized as plasmon active tags for SEF applications. UV-vis measurements confirmed a distinct peak at 385 nm in addition to two shoulder peaks at 350 and 450 nm. The optical band gap of as-synthesized nanoparticles was estimated to be 2.87 eV as observed in the Tauc plot. Further insight into crystal growth and d-spacing was carried out using HRTEM. It was revealed that most of the crystal growth is in [111] lattice structure in addition to a few lattices in [311], [222], and [220] directions as observed in the SAED pattern and d-spacing calculation. As-synthesized arbitrary-shaped silver nanoparticles were found to have luminescence emission at 428 nm with FWHM of 103.56 nm while excited at 316 nm. FTIR measurements confirmed that only two strong absorption peaks were observed: one at 3249 $cm^{-1}$ represents O—H stretching mode because of the strong interaction of water/moisture with the surface of silver nanoparticles and the other one at 1633 $cm^{-1}$ represents the presence of $NO_2$ which could be from $AgNO_3$ solution, the metal precursor used in the synthesis of silver nanoparticles. The fluorescence images of fluorophores, R6G-incubated nanoparticles, were recorded and compared to that obtained for only R6G via an advanced fluorescent optical microscope. Fluorescence of R6G got enhanced several orders higher in presence of such small arbitrary-shaped silver nanoparticles. FDTD analysis was carried out to understand the EM near-field distribution that is mainly responsible for the SEF mechanism. A typical model SS3C was utilized in simulation and EM near-field distributions at three different axes; x-, y-, and z-planes were extracted for three different incident polarizations. Two elemental components, spheroid, and cone of the same dimensions and parameters were simulated separately as reference. The EM near-field distributions for the SS3C model were compared to those observed for spheroids and cones as well. The EM near-field distributions for the SS3C model were found widely distributed with reference to those obtained in isolated elements. Such distributed EM near-fields influence and couple with the excitation and absorption characteristics of fluorophores that led to enhanced fluorescence emission in presence of silver nanoparticles.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of increasing a fluorescence signal of a fluorophore, comprising:
   dissolving the fluorophore in a solvent to form a solution;
   adding silver nanoparticles to the solution to form a mixture;
      wherein the silver nanoparticles have a size of 3-10 nm;
      wherein the silver nanoparticles have an irregular shape and at least one fractal structure;
   at least partially coating a substrate with the mixture to form a fluorescence sample; and
   recording a fluorescence image of the fluorescence sample;
   wherein the fluorophore is adsorbed to at least one silver nanoparticle;
   wherein the fluorescence signal of the fluorescence image is higher than a fluorescence signal of a fluorescence image of the fluorophore without the silver nanoparticles.

2. The method of claim 1, wherein the silver nanoparticles have:
   a substantially crystalline structure.

3. The method of claim 1, wherein the silver nanoparticles have:
   —OH and —$NO_2$ functional groups on a surface.

4. The method of claim 1, wherein:
   at least a portion of the silver nanoparticles have at least two fractal structures in an individual nanoparticle.

5. The method of claim 1, wherein:
   at least a portion of the silver nanoparticles have at least two different lattice fringes in an individual nanoparticle.

6. The method of claim 5, wherein:
   the lattice fringes are in different directions.

7. The method of claim 5, wherein:
   the lattice fringes are in the same direction.

8. The method of claim 5, wherein:
   a lattice fringe has a d-spacing of 0.20-0.24 nm; and
   corresponds to the [200] crystal structure of silver.

9. The method of claim 5, wherein:
   a lattice fringe has a d-spacing of 0.22-0.26 nm; and
   corresponds to the [111] crystal structure of silver.

10. The method of claim 1, wherein:
    at least a portion of the silver nanoparticles are twinned.

11. The method of claim 1, wherein the silver nanoparticles have:
    an optical bandgap of 2.8-2.9 eV.

12. The method of claim 1, wherein the silver nanoparticles have:
    a maximum absorption signal at 350-400 nm.

13. The method of claim 1, wherein the silver nanoparticles have:
a maximum fluorescence signal at 420-440 nm.

14. The method of claim 1, wherein the silver nanoparticles have:
an electromagnetic field intensity of 6-60 V/m.

15. The method of claim 1, wherein:
the fluorophore is selected from a group consisting of a rhodamine derivative, a fluorescein derivative, a cyanine derivative, and a coumarin derivative.

16. The method of claim 1, wherein:
the fluorescence sample is irradiated with 300-330 nm light to record the fluorescence image.

17. The method of claim 1, wherein:
the fluorescence signal of the fluorescence image is 10 to 10,000 times higher than a fluorescence signal of a fluorescence image of the fluorophore without the silver nanoparticles.

18. The method of claim 1, wherein the silver nanoparticles are made by a method comprising:
dissolving sodium borohydride in water at a temperature of 5 to 15° C. to form a 1-3 mM sodium borohydride stock solution;
dissolving silver nitrate in water at a temperature of 20 to 25° C. to form a 0.5-2 mM silver nitrate stock solution; and
adding the silver nitrate stock solution dropwise to the sodium borohydride stock solution at a temperature of 5 to 15° C. to form a silver nanoparticle solution;
wherein the sodium borohydride stock solution and silver nitrate stock solution are added together within 30 minutes of dissolving the sodium borohydride and silver nitrate in water.

19. The method of claim 18, wherein:
the rate of dropwise addition is 1-10 drops per second.

20. The method of claim 18, further comprising:
centrifuging the silver nanoparticle solution and filtering to leave a solid;
washing the solid with water to form the silver nanoparticles.

* * * * *